(12) United States Patent
Takagi et al.

(10) Patent No.: US 7,813,115 B2
(45) Date of Patent: Oct. 12, 2010

(54) COUPLING UNIT AND ELECTRONIC APPARATUS

(75) Inventors: Hisamitsu Takagi, Kawasaki (JP); Satoshi Kanbayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 263 days.

(21) Appl. No.: 12/230,870

(22) Filed: Sep. 5, 2008

(65) Prior Publication Data
US 2009/0273890 A1    Nov. 5, 2009

(30) Foreign Application Priority Data
Sep. 6, 2007    (JP)    ............................. 2007-231739

(51) Int. Cl.
*G06F 1/16*    (2006.01)

(52) U.S. Cl. .................. 361/679.27; 455/566; 606/102; 16/347; 623/20.21

(58) Field of Classification Search .............. 455/575.3, 455/575.1, 566; 606/69, 99, 102, 151; 361/679.01, 361/679.02, 679.06, 679.08, 679.27, 679.28, 361/679.31, 679.32, 679.33, 679.34, 679.36, 361/679.55; 16/367, 303, 332, 347; 345/173, 345/204, 156, 428; 248/571; 623/11.11, 623/1.23, 13.12, 20.21

See application file for complete search history.

(56) References Cited

U.S. PATENT DOCUMENTS

| 5,629,833 A | 5/1997 | Ido et al. |
| 2005/0107795 A1* | 5/2005 | Morris et al. .................. 606/69 |
| 2008/0146296 A1* | 6/2008 | Sakashita et al. ......... 455/575.3 |
| 2009/0009950 A1* | 1/2009 | Hattori et al. ............... 361/681 |

FOREIGN PATENT DOCUMENTS

| JP | 8-63259 | 3/1996 |
| JP | 2006-80713 | 3/2006 |

\* cited by examiner

*Primary Examiner*—Hung V Duong
(74) *Attorney, Agent, or Firm*—Staas & Halsey LLP

(57) ABSTRACT

A second enclosure defines the backside superposed on a first enclosure for relative rotation around a rotation axis set perpendicular to the front surface of the first enclosure in an electronic apparatus. First, second and third flat surfaces are defined on the backside of the second enclosure at positions inside the contour of the second enclosure. The receiving pieces receive the first flat surface when the second enclosure is set in the reference attitude. When the second enclosure is set in the lateral attitude by rotation by plus or minus 90 degrees, the second flat surface or the third flat surface is received on the receiving pieces behind the second enclosure. Even if friction resulting from the contact roughens the first, second and third surfaces, the asperity and scratches on the surfaces are hidden behind the second enclosure.

7 Claims, 23 Drawing Sheets

COUPLING UNIT AND ELECTRONIC APPARATUS

BACKGROUND OF THE INVENTION

1. Field of the Invention

The present invention relates to an electronic apparatus such as a cellular or mobile phone terminal, for example. In particular, the present invention relates to a coupling unit designed to couple a first enclosure with a second enclosure in the electronic apparatus for a relative rotation therebetween.

2. Description of the Prior Art

A cellular or mobile phone terminal capable of receiving broadcasts is well known, for example. Such a mobile phone terminal includes a first enclosure, namely a display enclosure. A display panel is enclosed in the display enclosure. The display enclosure is coupled to a second enclosure, namely a bracket. The bracket is coupled to the main body of the mobile phone terminal so as to establish an opened state and a closed state. A communication circuit and a controller circuit are incorporated in the main body. A keypad is embedded in the surface of the main body.

The display enclosure is designed to rotate on the bracket around a rotation axis perpendicular to the screen. The attitude of the display panel module can thus be changed from the attitude allowing the portrait screen to the attitude allowing the landscape screen. The user of the mobile phone terminal is allowed to enjoy the landscape screen rather suitable for watching the television. It is required to reliably hold the display panel in the lateral or landscape attitude so that the user is allowed to keep enjoying the landscape screen.

SUMMARY OF THE INVENTION

It is accordingly an object of the present invention to provide a coupling unit contributing to a reliable coupling of a first enclosure with a second enclosure. It is also an object of the present invention to provide an electronic apparatus including such a coupling unit.

According to a first aspect of the present invention, there is provided an electronic apparatus comprising: a first enclosure; a second enclosure defining the backside superposed on the first enclosure for relative rotation around a rotation axis set perpendicular to the front surface of the first enclosure, said relative rotation being restricted within a range of plus/minus 90 degrees from a reference attitude; a first flat surface defined on the backside of the second enclosure at a position inside the contour of the second enclosure, the first flat surface facing outward in the radial direction of the rotation axis, the first flat surface extending straight along an imaginary plane set perpendicular to the rotation axis; a second flat surface defined on the backside of the second enclosure at a position inside the contour of the second enclosure, the second flat surface facing outward in the radial direction of the rotation axis, the second flat surface extending from one end of the first flat surface along the imaginary plane in the direction perpendicular to the first flat surface; a third flat surface defined on the backside of the second enclosure at a position inside the contour of the second enclosure, the third flat surfaced facing outward in the radial direction of the rotation axis, the third flat surface extending along the imaginary plane from an other end of the first flat surface in parallel with the second flat surface; and a pair of receiving pieces placed on the front surface of the first enclosure at a position inside the contour of the second enclosure, the receiving pieces receiving the first flat surface at a position behind the second enclosure when the second enclosure is set in the reference attitude, the receiving pieces receiving the second flat surface at a position behind the second enclosure when the second enclosure is set in an attitude of the plus 90 degrees from the reference attitude around the rotation axis, the receiving pieces receiving the third flat surface at a position behind the second enclosure when the second enclosure is set in an attitude of the minus 90 degrees from the reference attitude.

The electronic apparatus allows the receiving pieces to receive the first flat surface behind the second enclosure when the second enclosure is set in the reference attitude. The first flat surface thus serves to hold the second enclosure in the reference attitude. Likewise, when the second enclosure is set in the lateral attitude by rotation by plus 90 degrees, the second flat surface is received on the receiving pieces behind the second enclosure. The second flat surface thus serves to hold the second enclosure in the lateral attitude of plus 90 degrees. When the second enclosure is set in the lateral attitude by rotation by minus 90 degrees, the third flat surface is received on the receiving pieces behind the second enclosure. The third flat surface thus serves to hold the second enclosure in the lateral attitude of minus 90 degrees. In these cases, the first, second and third flat surfaces and the receiving pieces are hidden behind the second enclosure. Even if friction resulting from the contact roughens the first, second and third surfaces, the asperity and scratches on the surfaces are hidden behind the second enclosure. The second enclosure is kept in a good appearance in the electronic apparatus.

The electronic apparatus may further comprise: a fixation plate fixed to the first enclosure; a guide opening formed in the fixation plate, the guide opening extending along a reference straight line set parallel to the second flat surface and the third flat surface when the second enclosure is set in the reference attitude; a cylinder received in the guide opening, the cylinder designed to move within the guide opening along the reference straight line with its longitudinal axis kept in a perpendicular attitude normal to the fixation plate; a rotating plate coupled to the cylinder, the rotating plate superposed on the fixation plate for relative rotation around the longitudinal axis of the cylinder, the relative rotation being restricted in a range of plus/minus 90 degrees from a reference attitude, the rotating plate being fixed to the backside of the second enclosure; and an elastic member attached to the fixation plate for engagement with the cylinder, the elastic member exhibiting an elastic force for urging the cylinder toward one end of the guide opening.

According to a second aspect of the present invention, there is provided a coupling unit comprising: a fixation plate; a guide opening formed in the fixation plate, the guide opening extending along a predetermined reference straight line; a cylinder received in the guide opening, the cylinder designed to move within the guide opening along the predetermined reference straight line with its longitudinal axis kept in a perpendicular attitude normal to the fixation plate; a rotating plate coupled to the cylinder, the rotating plate superposed on the fixation plate for relative rotation around the longitudinal axis of the cylinder, the relative rotation being restricted in a range of plus/minus 90 degrees from a reference attitude; an elastic member attached to the fixation plate for engagement with the cylinder, the elastic member exhibiting an elastic force for urging the cylinder toward one end of the guide opening; and a pair of protrusions placed on the fixation plate at a position outside the guide opening, the protrusions being symmetric relative to the predetermined reference straight line, the protrusions receiving an edge of the rotating plate when the rotating plate is set in one of the reference attitude, an attitude of the plus 90 degrees from the reference attitude and an attitude of the minus 90 degrees from the reference attitude.

The coupling unit allows the protrusions to receive the edge of the rotating plate when the rotating plate is set in the reference attitude, the lateral attitude of the plus 90 degrees and the lateral attitude of the minus 90 degrees. The rotating plate is urged against the protrusions with the assistance of the elastic member. The rotating plate is thus reliably held in the reference attitude, the lateral attitude of plus 90 degrees or the lateral attitude of minus 90 degrees. The rotating plate is prevented from rattling.

According to a third aspect of the present invention, there is provided an electronic apparatus comprising: a first enclosure; a fixation plate fixed to the front surface of the first enclosure; a guide opening formed in the fixation plate, the guide opening extending along a predetermined reference straight line; a cylinder received in the guide opening, the cylinder designed to move within the guide opening along the predetermined reference straight line with its longitudinal axis kept in a perpendicular attitude normal to the fixation plate; a rotating plate coupled to the cylinder, the rotating plate superposed on the fixation plate for relative rotation around the longitudinal axis of the cylinder, the relative rotation being restricted in a range of plus/minus 90 degrees from a reference attitude; an elastic member attached to the fixation plate for engagement with the cylinder, the elastic member exhibiting an elastic force for urging the cylinder toward one end of the guide opening; a pair of protrusions placed on the fixation plate or the first enclosure at a position outside the guide opening, the protrusions being symmetric relative to the predetermined reference straight line, the protrusions receiving the edge of the rotating plate when the rotating plate is set in one of the reference attitude, the attitude of the plus 90 degrees from the reference attitude and the attitude of the minus 90 degrees from the reference attitude; and a second enclosure defining the backside coupled to the rotating plate, the backside being superposed on the front surface of the first enclosure.

The electronic apparatus allows the protrusions to receive the edge of the rotating plate when the rotating plate is set in the reference attitude, the lateral attitude by rotation by plus 90 degrees or the lateral attitude by rotation by minus 90 degrees. The rotating plate is urged against the protrusions with the assistance of the elastic member. The second enclosure is thus reliably held in the reference attitude, the lateral attitude of plus 90 degrees or the lateral attitude by minus 90 degrees. The second enclosure is prevented from rattling relative to the first enclosure. A contact is prevented to the utmost between the first enclosure and the second enclosure when the second enclosure is to be kept in these attitudes. The surfaces of the first enclosure and the second enclosure are thus prevented from suffering from asperity and scratches. The first enclosure and the second enclosure are kept in a good appearance.

According to a fourth aspect of the present invention, there is provided an electronic apparatus comprising: a first enclosure; a fixation plate fixed to the front surface of the first enclosure; a guide opening formed in the fixation plate, the guide opening extending along a predetermined reference straight line; a cylinder received in the guide opening, the cylinder designed to move within the guide opening along the predetermined reference straight line with its longitudinal axis kept in a perpendicular attitude normal to the fixation plate; a rotating plate coupled to the cylinder, the rotating plate superposed on the fixation plate for relative rotation around the longitudinal axis of the cylinder, the relative rotation being restricted in a range of plus/minus 90 degrees from a reference attitude; an elastic member attached to the fixation plate for engagement with the cylinder, the elastic member exhibiting an elastic force for urging the cylinder toward one end of the guide opening; a first protrusion placed on the fixation plate or the first enclosure at a position outside the guide opening at a position spaced from the predetermined reference straight line, the first protrusion receiving the edge of the rotating plate when the rotating plate is set in one of the reference attitude and an attitude plus 90 degrees from the reference attitude; a second protrusion placed on the fixation plate or the first enclosure at a position outside the guide opening, the second protrusion being symmetric to the first protrusion with respect to the predetermined reference straight line, the second protrusion receiving the edge of the rotating plate when the rotating plate is set in one of the reference attitude and an attitude of minus 90 degrees from the reference attitude; a second enclosure defining the backside coupled to the rotating plate, the backside being superposed on the front surface of the first enclosure; a first protruding piece placed on the first enclosure, the first protruding piece restraining rotation of the second enclosure around the longitudinal axis of the cylinder when the rotating plate is set in the attitude of the minus 90 degrees from the reference attitude; and a second protruding piece placed on the first enclosure, the second protruding piece restraining rotation of the second enclosure around the longitudinal axis of the cylinder when the rotating plate is set in the attitude of the plus 90 degrees from the reference attitude.

The electronic apparatus allows the first and second protrusions to receive the edge of the rotating plate when the second enclosure is set in the reference attitude. The rotating plate is urged against the first and second protrusions with the assistance of the elastic member. The second enclosure is thus reliably held in the reference attitude. When the second enclosure is set in the lateral attitude by rotation by plus 90 degrees, the edge of the rotating plate is received on the first protrusion. The second protruding piece simultaneously restrains the rotation of the second enclosure around the longitudinal axis of the cylinder. The rotating plate and the second enclosure are urged against the first protrusion and the second protruding piece, respectively, with the assistance of the elastic member. The second enclosure is in this manner reliably held in the lateral attitude of plus 90 degrees. Likewise, when the second enclosure is set in the lateral attitude by rotation by minus 90 degrees, the edge of the rotating plate is received on the second protrusion. The first protruding piece simultaneously restrains the rotation of the second enclosure around the longitudinal direction of the cylinder. The rotating plate and the second enclosure are urged against the second protrusion and the first protruding piece, respectively, with the assistance of the elastic member. The second enclosure is in this manner reliably held in the lateral attitude of minus 90 degrees. Moreover, when the second enclosure is held in the lateral attitude of plus 90 degrees, the second enclosure contacts only with the second protruding piece. When the second enclosure is held in the lateral attitude of minus 90 degrees, the second enclosure contacts only with the first protruding piece. The number of times of contact of the second enclosure is significantly suppressed. The second enclosure keeps a good appearance in the electronic apparatus.

According to a fifth aspect of the present invention, there is provided a coupling unit comprising: a fixation plate; a guide opening formed in the fixation plate, the guide opening extending along a predetermined reference straight line; a cylinder received in the guide opening, the cylinder designed to move within the guide opening along the predetermined reference straight line with its longitudinal axis kept in a perpendicular attitude normal to the fixation plate; a rotating plate coupled to the proximal end of the cylinder, the rotating plate superposed on the fixation plate for relative rotation around the longitudinal axis of the cylinder, the relative rotation being restricted in a range of plus/minus 90 degrees from a reference attitude; a flange coupled to the distal end of the cylinder, the flange extending outward from the cylinder so as to prevent the cylinder from slipping out of the guide opening; a first elastic member attached to the fixation plate for engagement with the cylinder, the first elastic member exhibiting an elastic force for urging the cylinder toward one end of the guide opening; and a second elastic member placed between the fixation plate and the flange at a position outside the guide opening, the second elastic member exhibiting an elastic force for distancing the flange farther away from the fixation plate.

The coupling unit enables prevention of rattling between the flange and the fixation plate with the assistance of the second elastic member. Specifically, rattling is prevented between the fixation plate and the rotating plate.

According to a sixth aspect of the present invention, there is provided an electronic apparatus comprising: a first enclosure; a fixation plate fixed to the front surface of the first enclosure; a guide opening formed in the fixation plate, the guide opening extending along a predetermined reference straight line; a cylinder received in the guide opening, the cylinder designed to move within the guide opening along the predetermined reference straight line with its longitudinal axis kept in a perpendicular attitude normal to the fixation plate; a rotating plate coupled to the proximal end of the cylinder, the rotating plate superposed on the fixation plate for relative rotation around the longitudinal axis of the cylinder, the relative rotation being restricted in a range of plus/minus 90 degrees from a reference attitude; a flange coupled to the distal end of the cylinder, the flange extending outward from the cylinder so as to prevent the cylinder from slipping out of the guide opening; a first elastic member attached to the fixation plate for engagement with the cylinder, the first elastic member exhibiting an elastic force for urging the cylinder toward one end of the guide opening; a second elastic member placed between the fixation plate and the flange at a position outside the guide opening, the second elastic member exhibiting an elastic force for distancing the flange farther away from the fixation plate; and a second enclosure defining the backside coupled to the rotating plate, the backside being superposed on the front surface of the first enclosure.

The electronic apparatus enables prevention of rattling between the flange and the fixation plate with the assistance of the second elastic member. Specifically, rattling is prevented between the first enclosure and the second enclosure.

According to a seventh aspect of the present invention, there is provided a coupling unit comprising: a fixation plate; a guide opening formed in the fixation plate, the guide opening extending along a predetermined reference straight line; a cylinder received in the guide opening, the cylinder designed to move within the guide opening along the predetermined reference straight line with its longitudinal axis kept in a perpendicular attitude normal to the fixation plate; a rotating plate coupled to the proximal end of the cylinder, the rotating plate superposed on the fixation plate for relative rotation around the longitudinal axis of the cylinder, the relative rotation being restricted in a range of plus/minus 90 degrees from a reference attitude; a flange coupled to the distal end of the cylinder, the flange extending outward from the cylinder so as to prevent the cylinder from slipping out of the guide opening; a torsion spring attached to the fixation plate, the torsion spring including an arm portion extending from a coil portion, the arm portion engaging with the outer peripheral surface of the cylinder, the torsion spring exhibiting an elastic force for urging the cylinder toward one end of the guide opening; and a pair of ribs respectively defining inclined surfaces extending at both sides of the guide opening in parallel with the guide opening, the inclined surfaces getting farther from the front surface of the fixation plate as position gets closer to the one end of the guide opening, wherein the arm portion of the torsion spring is designed to apply an elastic force to the flange coupled to the cylinder at a position between the inclined surfaces in the direction to distance the flange farther away from the front surface of the fixation plate as the arm portion of the torsion spring moves upward along the inclined surfaces of the pair of ribs.

The coupling unit enables prevention of rattling between the flange and the fixation plate with the assistance of the torsion spring and the ribs. Specifically, rattling is prevented between the fixation plate and the rotating plate.

According to an eighth aspect of the present invention, there is provided an electronic apparatus comprising: a first enclosure; a fixation plate fixed to the front surface of the first enclosure; a guide opening formed in the fixation plate, the guide opening extending along a predetermined reference straight line; a cylinder received in the guide opening, the cylinder designed to move within the guide opening along the predetermined reference straight line with its longitudinal axis kept in a perpendicular attitude normal to the fixation plate; a rotating plate coupled to the proximal end of the cylinder, the rotating plate superposed on the fixation plate for relative rotation around the longitudinal axis of the cylinder, the relative rotation being restricted in a range of plus/minus 90 degrees from a reference attitude; a flange coupled to the distal end of the cylinder, the flange extending outward from the cylinder so as to prevent the cylinder from slipping out of the guide opening; a torsion spring attached to the fixation plate, the torsion spring including an arm portion extending from a coil portion, the arm portion engaging with the outer peripheral surface of the cylinder, the torsion spring exhibiting an elastic force for urging the cylinder toward one end of the guide opening; a pair of ribs respectively defining inclined surfaces extending at both sides of the guide opening in parallel with the guide opening, the inclined surfaces getting farther from the front surface of the fixation plate as position gets closer to the one end of the guide opening; and a second enclosure defining the backside coupled to the rotating plate, the backside being superposed on the front surface of the first enclosure, wherein the arm portion of the torsion spring is designed to apply an elastic force to the flange coupled to the cylinder at a position between the inclined surfaces in the direction to distance the flange farther away from the front surface of the fixation plate as the arm portion of the torsion spring moves upward along the inclined surfaces of the pair of ribs.

The electronic apparatus allows prevention of rattling between the flange and the fixation plate with the assistance of the torsion spring and the ribs. Specifically, rattling is prevented between the first enclosure and the second enclosure.

According to a ninth aspect of the present invention, there is provided a coupling unit comprising: a fixation plate; a guide opening formed in the fixation plate, the guide opening extending along a predetermined reference straight line; a cylinder received in the guide opening, the cylinder designed to move within the guide opening along the predetermined reference straight line with its longitudinal axis kept in a perpendicular attitude normal to the fixation plate; a rotating plate coupled to the cylinder, the rotating plate superposed on the fixation plate for relative rotation around the longitudinal axis of the cylinder, the relative rotation being restricted in a range of plus/minus 90 degrees from a reference attitude; and a torsion spring attached to the fixation plate, the torsion spring including an arm portion extending from a coil portion, the arm portion engaging with the outer peripheral surface of the cylinder, the torsion spring exhibiting an elastic force for urging the cylinder toward one end of the guide opening, wherein an inclined surface is defined on the outer peripheral surface of the cylinder, the inclined surface getting farther from the longitudinal axis of the cylinder as the position gets farther away from the front surface of the fixation plate, the inclined surface receiving the arm portion of the torsion spring.

The coupling unit enables prevention of rattling between the flange and the fixation plate with the assistance of the torsion spring and the inclined surface. Specifically, rattling is prevented between the fixation plate and the rotating plate.

The coupling unit may further comprise: a flange coupled to the cylinder, the flange extending outward from the cylinder so that the cylinder is held within the guide opening between the flange and the rotating plate; and an elastic member placed on the fixation plate at a position outside the one end of the guide opening, the elastic member exhibiting an elastic force in the direction to distance the flange away from the fixation plate. The elastic member exhibits an elastic force in the direction to distance the flange away from the fixation plate. The torsion spring exhibits an elastic force in the direction to distance the flange away from the fixation plate with the assistance of the inclined surface as described above. These elastic forces are balanced with each other. The elastic forces are thus equally applied to the cylinder. The cylinder is in this manner prevented from being inclined.

According to the tenth aspect of the present invention, there is provided an electronic apparatus comprising: a first enclosure; a fixation plate fixed to the front surface of the first enclosure; a guide opening formed in the fixation plate, the guide opening extending along a predetermined reference straight line; a cylinder received in the guide opening, the cylinder designed to move within the guide opening along the predetermined reference straight line with its longitudinal axis kept in a perpendicular attitude normal to the fixation plate; a rotating plate coupled to the cylinder, the rotating plate superposed on the fixation plate for relative rotation around the longitudinal axis of the cylinder, the relative rotation being restricted in a range of plus/minus 90 degrees from a reference attitude; a torsion spring attached to the fixation plate, the torsion spring including an arm portion extending from a coil portion, the arm portion engaging with the outer peripheral surface of the cylinder, the torsion spring exhibiting an elastic force for urging the cylinder to be urged toward one end of the guide opening; and a second enclosure defining the backside coupled to the rotating plate, the backside being superposed on the front surface of the first enclosure, wherein an inclined surface is defined on the outer peripheral surface of the cylinder, the inclined surface getting farther from the longitudinal axis of the cylinder as the position gets farther away from a front surface of the fixation plate, the inclined surface receiving the arm portion of the torsion spring.

The electronic apparatus enables prevention of rattling between the flange and the fixation plate with the assistance of the torsion spring and the inclined surface. Specifically, rattling is prevented between the first enclosure and the second enclosure.

The electronic apparatus may further comprise, in the same manner as described above: a flange coupled to the cylinder, the flange extending outward from the cylinder so that the cylinder is held within the guide opening between the flange and the rotating plate; and an elastic member placed on the fixation plate at a position outside the one end of the guide opening, the elastic member exhibiting an elastic force in the direction to distance the flange away from the fixation plate.

According to an eleventh aspect of the present invention, there is provided an electronic apparatus comprising: a first enclosure; a fixation plate fixed to the front surface of the first enclosure; a guide opening formed in the fixation plate, the guide opening extending along a predetermined reference straight line; a guide shaft formed on the front surface of the fixation plate at a position outside the guide opening, the guide shaft having the longitudinal axis on the predetermined reference straight line; a cylinder received in the guide opening, the cylinder designed to move within the guide opening along the predetermined reference straight line with its longitudinal axis kept in a perpendicular attitude normal to the fixation plate; a rotating plate coupled to the cylinder for superposition on the fixation plate, the rotating plate set in a reference attitude when the bisector of the vertical angle of an imaginary isosceles right triangle is aligned with the predetermined reference straight line, the rotating plate defining a first outward cam surface and a second outward cam surface facing outward, the first outward cam surface kept in contact with the guide shaft while the vertex of one base angle of the imaginary isosceles right triangle moves on the base of the imaginary isosceles right triangle so as to reach the vertex of the other base angle of the imaginary isosceles right triangle, the second outward cam surface kept in contact with the guide shaft while the vertex of the other base angle of the imaginary isosceles right triangle moves on the base of the imaginary isosceles right triangle so as to reach the vertex of the one base angle of the imaginary isosceles right triangle; an elastic member attached to the fixation plate for engagement with the cylinder, the elastic member exhibiting an elastic force for urging the cylinder toward one end of the guide opening; a restriction piece attached to the tip end of the guide shaft; a second enclosure defining the backside coupled to the rotating plate, the backside being superposed on the front surface of the first enclosure; a first outward guide wall defined on the back side of the second enclosure, the first outward guide wall kept in contact with an imaginary cylindrical surface concentric with the guide shaft when the vertex of the one base angle of the imaginary isosceles right triangle moves on the base of the imaginary isosceles right triangle so as to reach the vertex of the other base angle of the imaginary isosceles right triangle; a second outward guide wall defined on the backside of the second enclosure, the second outward guide wall kept in contact with the imaginary cylindrical surface concentric with the guide shaft when the vertex of the other base angle of the imaginary isosceles right triangle moves on the base of the imaginary isosceles right triangle so as to reach the vertex of the one base angle of the imaginary isosceles right triangle; a partial cylindrical surface defined on the restriction piece along the imaginary cylindrical surface, the partial cylindrical surface kept in contact with the first outward guide wall or the second outward guide wall when the vertex of the one base angle or the other base angle of the imaginary isosceles right triangle moves on the base of the imaginary isosceles right triangle; a chipping surface chipping off the imaginary cylinder at a position outside the partial cylindrical surface, the chipping surface describing an actual movement path inside an imaginary movement path which the contour of the imaginary cylinder describes when the vertex of the one base angles or the other base angle of the imaginary isosceles right triangle; a third guide wall defined on the backside of the second enclosure so that a first guide groove is defined between the third guide wall and the first guide wall, the third guide wall extending along the actual movement path at an end of the first guide groove when the vertex of the one base angle of the imaginary isosceles right triangle moves on the base of the imaginary isosceles right triangle; and a fourth guide wall defined on the backside of the second enclosure so that a second guide groove is defined between the fourth guide wall and the second guide wall, the fourth guide groove extending along the actual movement path at an end of the second guide groove when the vertex of the other base angle of the imaginary isosceles right triangle moves on the base of the imaginary isosceles right triangle.

The electronic apparatus allows the intersection between the third guide wall and the fourth guide wall to get closer to the restriction piece at a position inside the intersection between the imaginary movement paths. The movement range of the second enclosure is thus narrowed. This results in suppression of rattling of the second enclosure.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
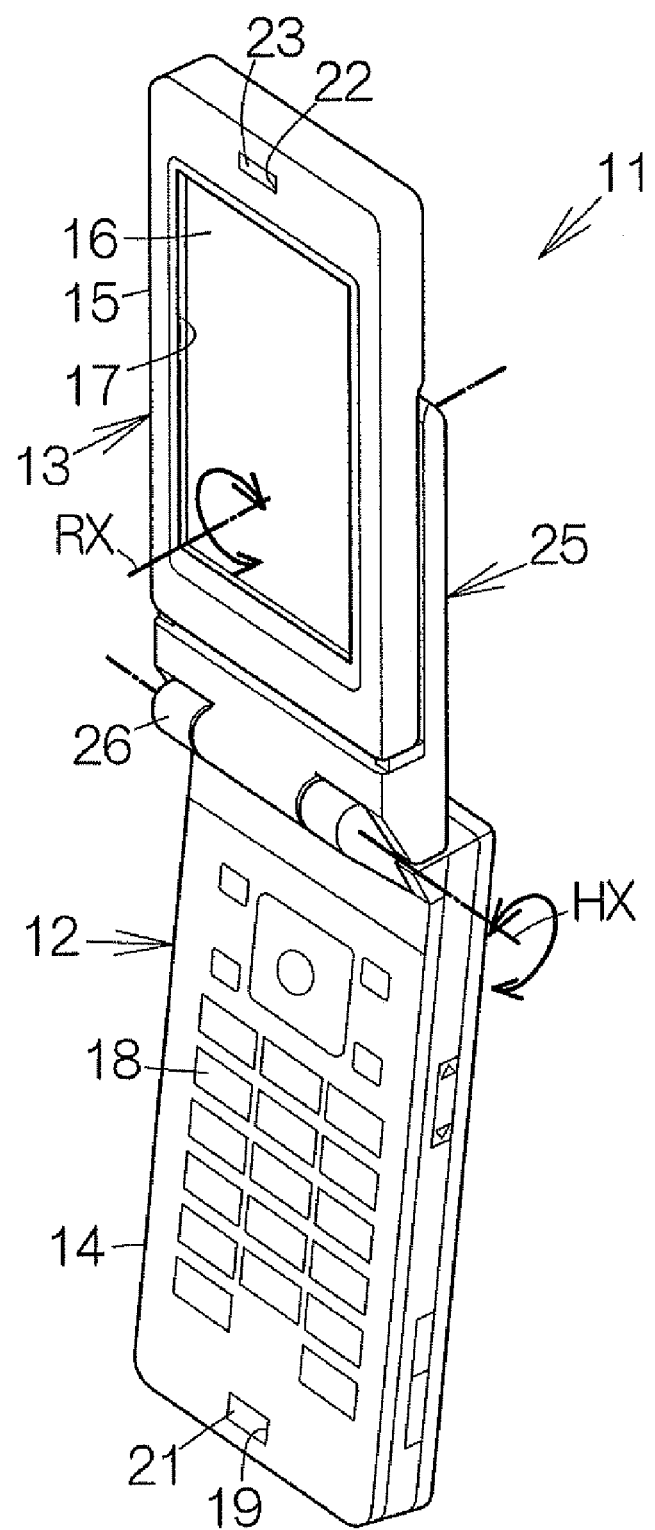
FIG. 1 is a perspective view schematically illustrating a cellular or mobile phone terminal of the clamshell type as a specific example of an electronic apparatus according to the present invention.

FIG. 1 schematically illustrates a cellular or mobile phone terminal 11 of the clamshell type as an example of an electronic apparatus according to the present invention. The mobile phone terminal 11 includes a main body 12 and a display unit 13. The main body 12 includes a main body enclosure 14. A printed circuit board is enclosed in the main body enclosure 14. Processing circuits, such as a central processing unit (CPU) and a memory, are mounted on the printed circuit board in a conventional manner. A television tuner such as a so-called one-segment tuner may be incorporated in the main body enclosure 14. The main body enclosure 14 may be molded from a reinforced resin material such as acrylonitrile butadiene styrene (ABS), for example.

The display unit 13 includes a display enclosure 15. The display enclosure 15 may be molded from a rein forced resin material such as acrylonitrile butadiene styrene (ABS), for example. A flat display panel module such as a liquid crystal display (LCD) panel module 16 is incorporated in the display enclosure 15. The LCD panel module 16 defines a screen exposed in a rectangular window opening 17. Various texts and graphics are displayed on the screen of the LCD panel module 16 in response to the processing of the CPU. Picture can also be displayed on the screen of the LCD panel module 16 in response to the operation of the aforementioned one-segment tuner.

Keypads 18, such as an on-hook keypad, an off-hook keypad, numeric keypads, and the like, are embedded in the main body 12. A microphone hole 19 is defined in the main body 12. A microphone 21 is placed within the microphone hole 19. A speaker hole 22 is defined in the display enclosure 15. A speaker 23 is placed within the speaker hole 22. The user of the mobile phone terminal 11 speaks to the microphone 21 during telephone conversation. The speaker 23 reproduces the voice of the other party.

A hinge bracket 25 is coupled to the main body enclosure 14. A hinge 26 is utilized to couple the hinge bracket 25. The hinge 26 enables relative rotation around a first rotation axis HX between the main body enclosure 14 and the hinge bracket 25. The first rotation axis HX extends in parallel with the front surface of the main body enclosure 14. The backside of the display enclosure 15 is superposed on the front surface of the hinge bracket 25. The display enclosure 15 is coupled to the hinge bracket 25 for relative rotation around a second rotation axis RX. The second rotation axis RX extends with in an imaginary plane perpendicular to the first rotation axis HX. The second rotation axis RX extends in a direction perpendicular to the front surface of the hinge bracket 25. The display enclosure 15 is in this manner allowed to rotate relative to the main body enclosure 14 around the first rotation axis HX.

When the mobile phone terminal 11 of the clamshell type is set in an opened attitude, the main body 12 and the display unit 13 face front. The main body 12 and the display unit 13 thus take an upright attitude. A portrait screen is established in the LCD panel module 16 on the main body 12 of the lengthwise attitude. The user of the mobile phone terminal 11 is allowed to simultaneously look at the keypads 18 such as the numeric keypads and at the portrait screen of the LCD panel module 16. The display enclosure 15 is rotatable around the first rotation axis HX. Such a rotation of the display enclosure 15 enables superposition of the display enclosure 15 on the front surface of the main body enclosure 14. The mobile phone terminal 11 thus takes a closed attitude. The mobile phone terminal 11 is set in a folded state in this manner.

Figure 2:
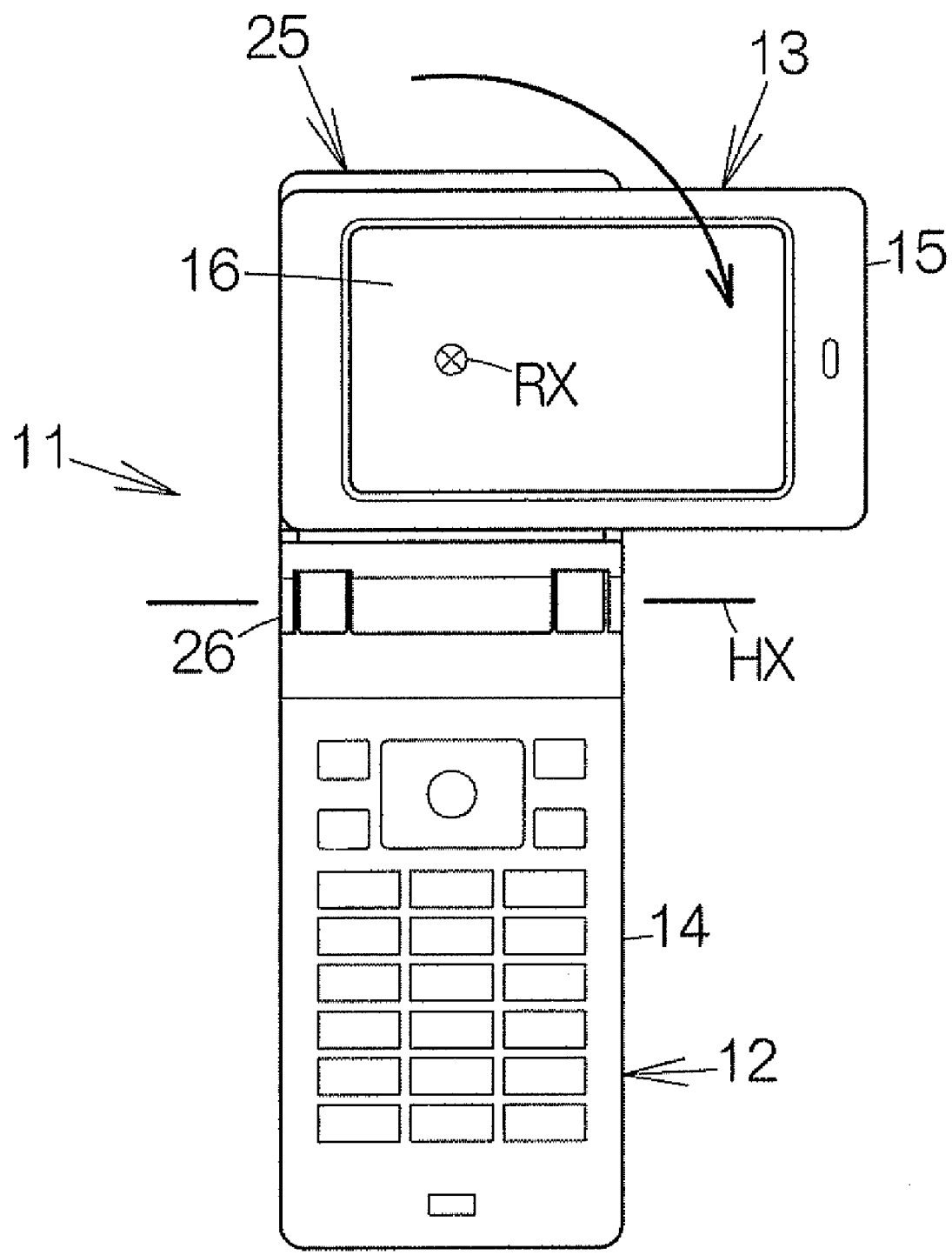
FIG. 2 is a front view schematically illustrating a display enclosure in a first lateral attitude while the mobile phone terminal is set in an opened attitude.
Figure 3:
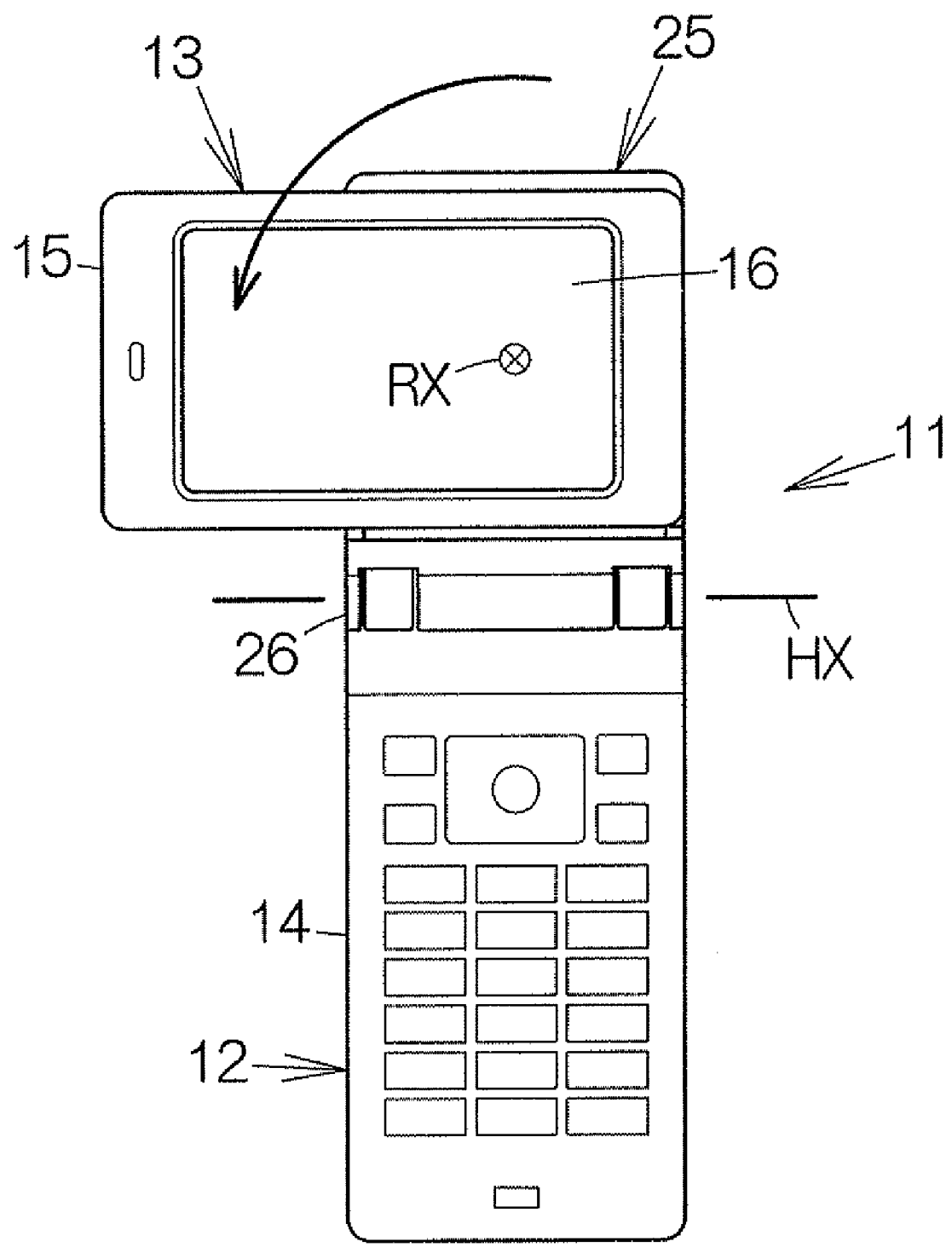
FIG. 3 is a front view schematically illustrating the display enclosure in a second lateral attitude when the mobile phone terminal is set in the opened attitude.

When the mobile phone terminal 11 takes the opened attitude, the display enclosure 15 is allowed to rotate around the second rotation axis RX, for example. When the display enclosure 15 rotates by the rotation angle of plus 90 degrees from the upright attitude, as shown in FIG. 2, the display enclosure 15 takes a first lateral attitude. A landscape screen is established on the LCD panel module 16. When the display enclosure 15 reversely rotates by the rotation angle of minus 90 degrees from the upright attitude, the display enclosure 15 takes a second lateral attitude, as shown in FIG. 3. The landscape screen is established on the LCD panel module 16. A coupling unit is interposed between the display unit 13 and the hinge bracket 25 for establishment of the lateral attitudes.

Figure 4:
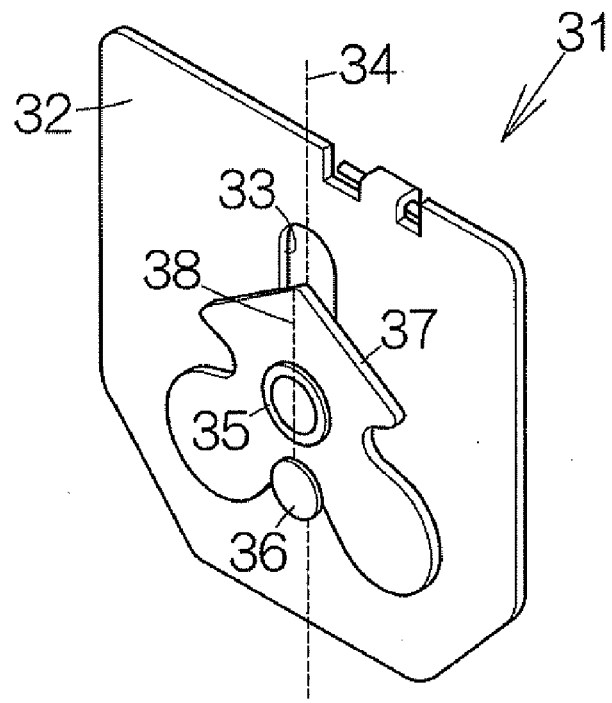
FIG. 4 is an enlarged perspective view of a coupling unit according to a first embodiment of the present invention.

As shown in FIG. 4, a coupling unit 31 according to a first embodiment of the present invention includes a fixation plate 32. The fixation plate 32 is superposed on the front surface of the hinge bracket 25. A screw or screws, not shown, are utilized to fix the fixation plate 32 on the hinge bracket 25. The fixation plate 32 may be made of a plate member having a constant thickness, for example. Pressing and punching process may be employed to shape the fixation plate 32, for example.

A guide opening 33 is formed in the fixation plate 32. The guide opening 33 extends along a predetermined reference straight line 34. The reference straight line 34 is defined within an imaginary plane including the front surface of the fixation plate 32. The reference straight line 34 forms a symmetry axis for the guide opening 33. The guide opening 33 has a shape symmetric relative to the symmetry axis.

A cylinder 35 is received in the guide opening 33. The longitudinal axis of the cylinder 35 is set perpendicular to the imaginary plane, including the front surface of the fixation plate 32, on the reference straight line 34. The cylinder 35 is designed to move within the guide opening 33 along the reference straight line 34. The longitudinal axis of the cylinder 35 is maintained in the perpendicular attitude normal to the fixation plate 32 during the movement of the cylinder 35. The longitudinal axis of the cylinder 35 thus moves on the reference straight line 34. A wiring, not shown, extends through a hollow space of the cylinder 35 from the hinge bracket 25 to the display enclosure 15, for example.

A guide shaft 36 is fixed on the front surface of the fixation plate 32 at a position outside the guide opening 33. The guide shaft 36 is a columnar body, for example. The longitudinal axis of the columnar body is set parallel with the longitudinal axis of the cylinder 35. The longitudinal axis of the guide shaft 36 intersects with the reference straight line 34 at right angles.

A rotating plate 37 is coupled to the cylinder 35. The rotating plate 37 is superposed on the front surface of the fixation plate 32. The rotating plate 37 is allowed to pivotally rotate around the longitudinal axis of the cylinder 35. A symmetry axis 38 is defined in the rotating plate 37. The rotating plate 37 has a shape symmetric relative to the symmetry axis 38. When the symmetry axis 38 of the rotating plate 37 is aligned with the reference straight line 34, the reference attitude of the rotating plate 37 is established. The rotating plate 37 is capable of rotating around the longitudinal axis of the cylinder 35 in a restricted range of plus/minus 90 degrees from the reference attitude as described later in detail. The rotating plate 37 is superposed on the backside of the display enclosure 15. A screw or screws, not shown, are utilized to fix the rotating plate 37 on the display enclosure 15, for example. The rotating plate 37 may be made of a plate member having a constant thickness, for example. Pressing and punching process may be employed to shape the rotating plate 37, for example.

Figure 5:
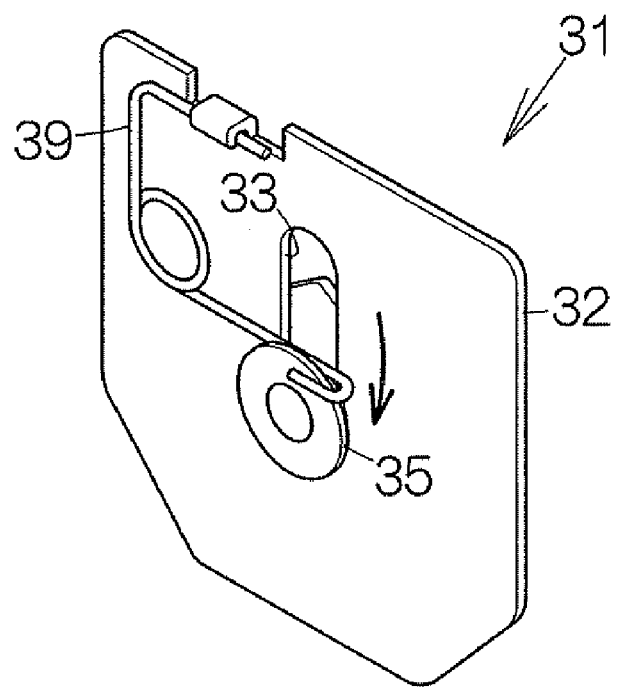
FIG. 5 is an enlarged perspective view schematically illustrating the backside of the coupling unit.

As shown in FIG. 5, an elastic member, namely a torsion spring 39, is attached to the fixation plate 32. The torsion spring 39 is engaged with the cylinder 35. The torsion spring 39 exhibits an elastic force or resilient force for urging the cylinder 35 toward one end of the guide opening 33 or toward the guide shaft 36.

Figure 6:
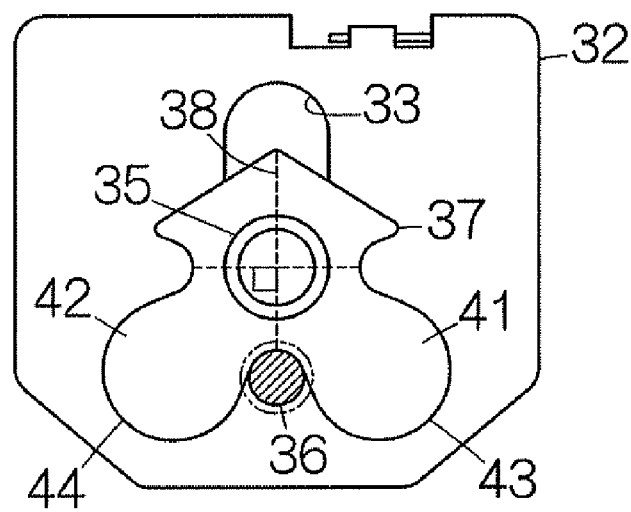
FIG. 6 is an enlarged plan view of the coupling unit.

As shown in FIG. 6, the rotating plate 37 includes a first cam plate 41 and a second cam plate 42. The first cam plate 41 extends within a range of minus 90 degrees from the symmetry axis 38 around the longitudinal axis of the cylinder 35. The second cam plate 42 extends in a range of plus 90 degrees from the symmetry axis 38 around the longitudinal axis of the cylinder 35. The first cam plate 41 defines a first outward cam surface 43 facing outward. The first outward cam surface 43 is kept in contact with the guide shaft 36 when the rotating plate 37 rotates around the longitudinal axis of the cylinder 35 in a range of plus 90 degrees from the reference attitude. Likewise, the second cam plate 42 defines a second outward cam surface 44 facing outward. The second outward cam surface 44 is kept in contact with the guide shaft 36 when the rotating plate 37 rotates around the longitudinal axis of the cylinder 35 in a range of minus 90 degrees from the reference attitude. The first outward cam surface 43 and the second outward cam surface 44 establish the "edge" of the rotating plate 37. A detailed description will be made on the shape of the first cam plate 41 and the second cam plate 42 later.

Figure 7:
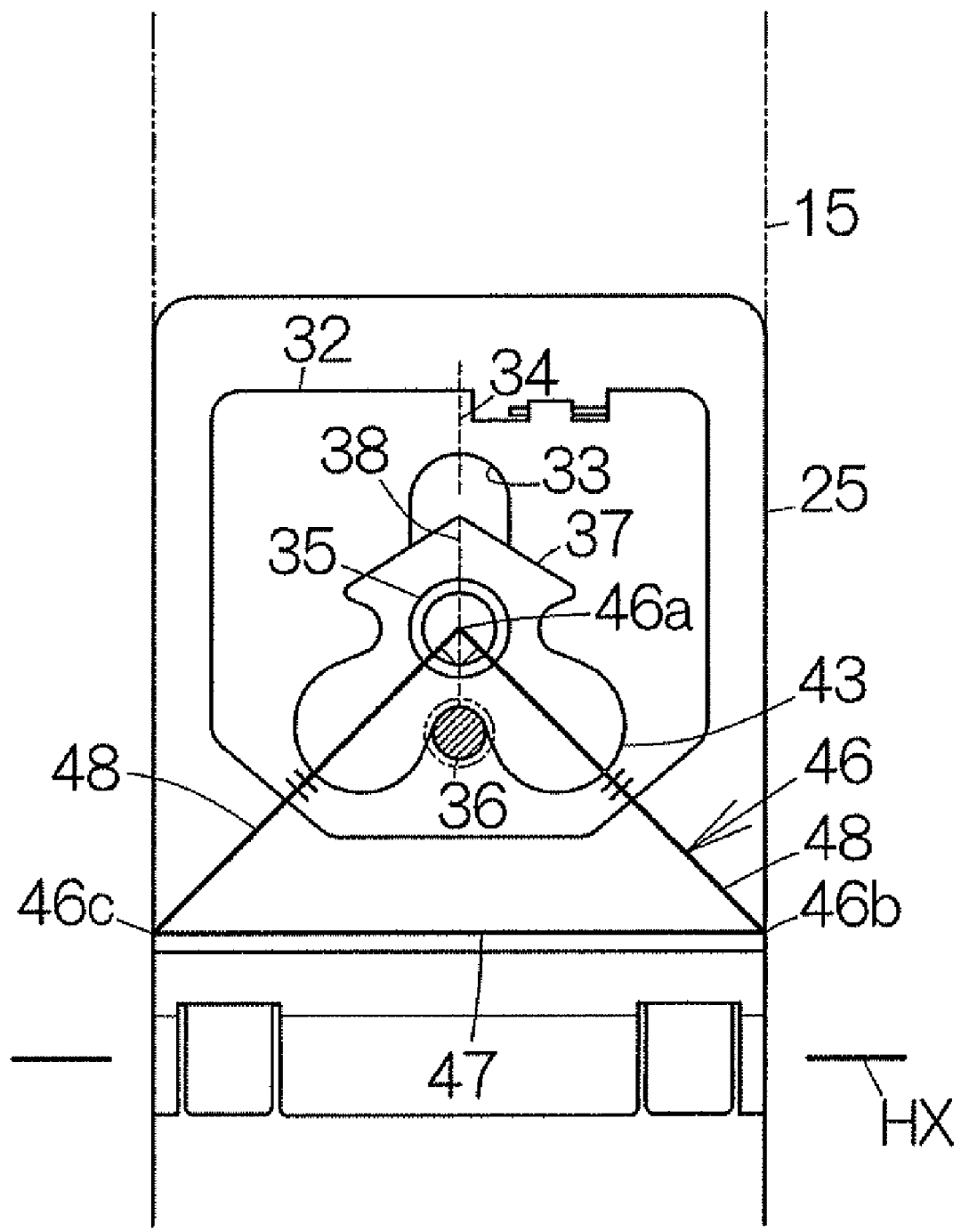
FIG. 7 is an enlarged plan view of the coupling unit, schematically illustrating the relationship between a first outward cam surface and a guide shaft.
Figure 8:
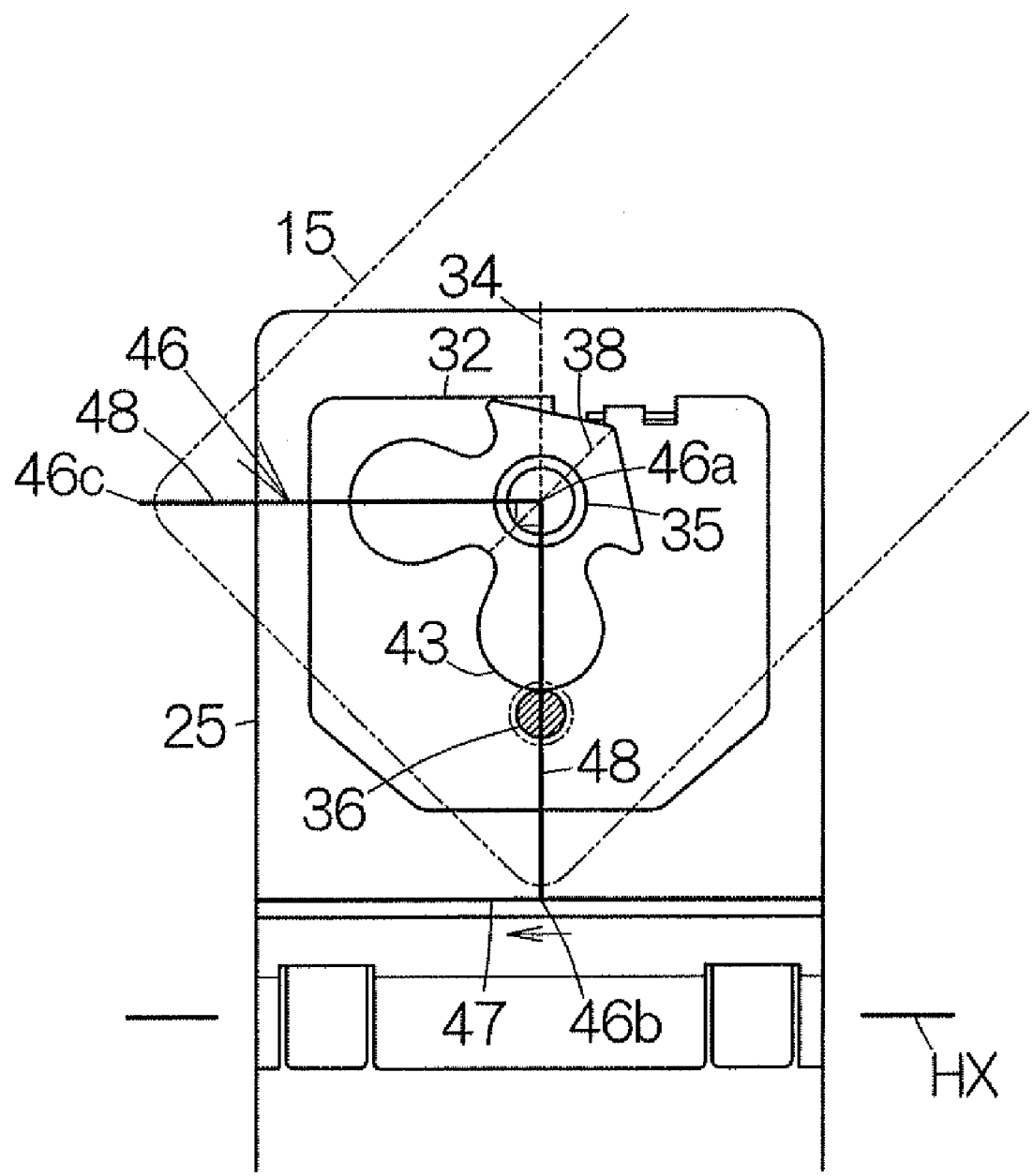
FIG. 8 is an enlarged plan view of the coupling unit, schematically illustrating the relationship between the first outward cam surface and the guide shaft.
Figure 9:
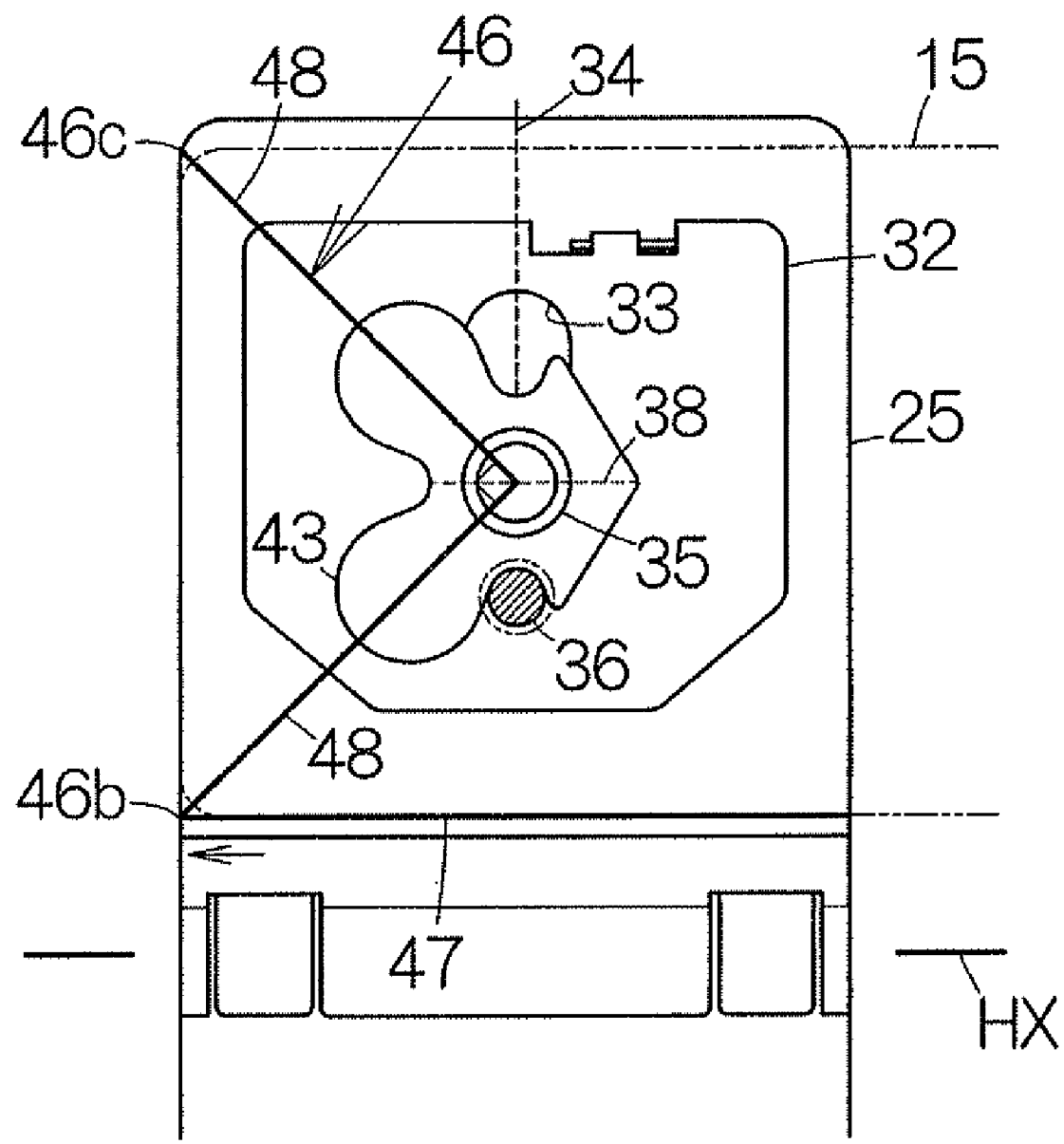
FIG. 9 is an enlarged plan view of the coupling unit, schematically illustrating the relationship between the first outward cam surface and the guide shaft.
Figure 10:
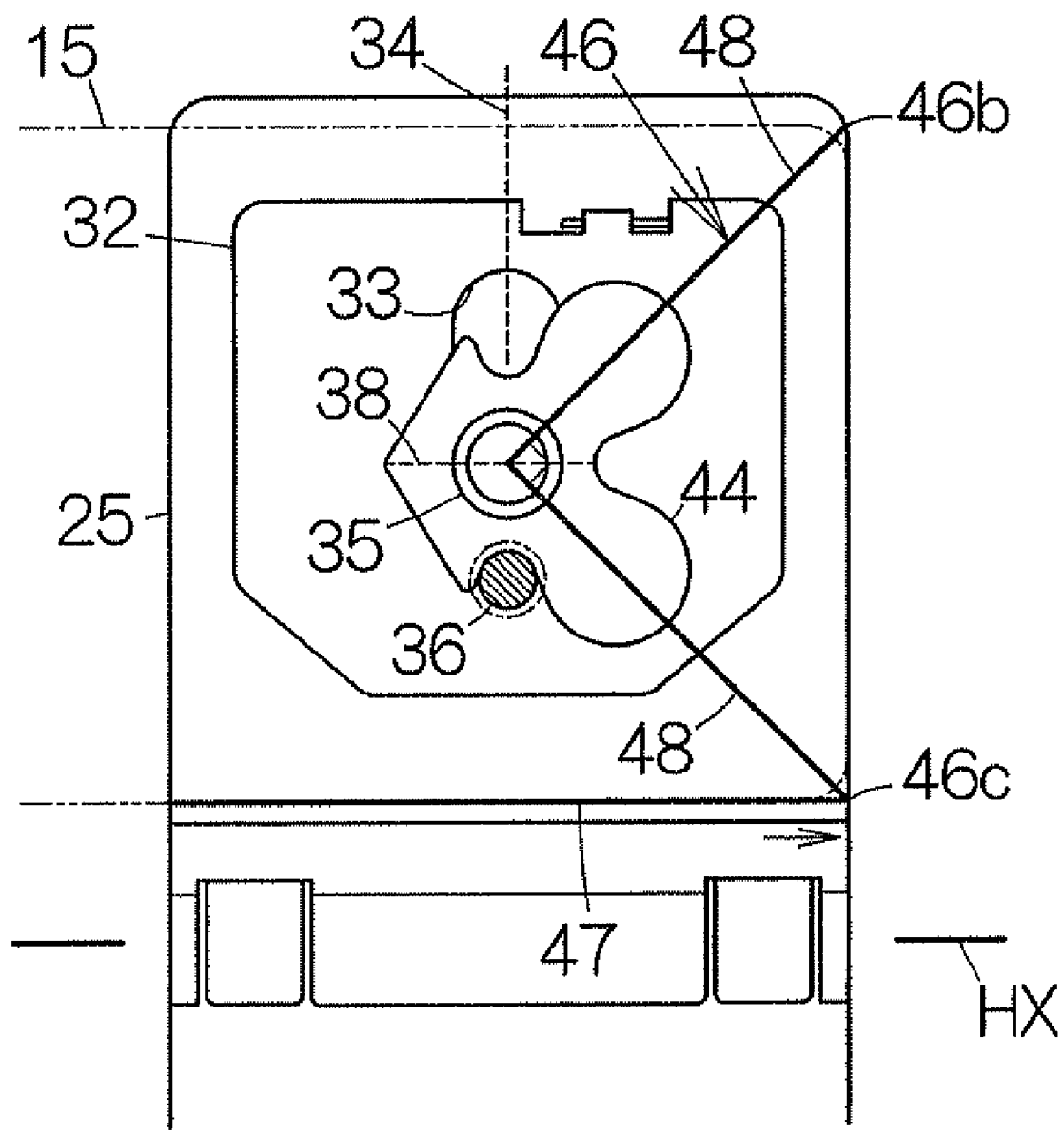
FIG. 10 is an enlarged plan view of the coupling unit, schematically illustrating the relationship between a second outward cam surface and the guide shaft.

Here, as shown in FIG. 7, an imaginary isosceles right triangle 46 is established for the fixation plate 32 and the rotating plate 37 within an imaginary plane including the front surface of the rotating plate 37. The vertex 46a of the vertical angle or right angle of the imaginary isosceles right triangle 46 located on the longitudinal axis of the cylinder 35. The bisector of the vertical angle of the imaginary isosceles right triangle 46 coincides with the aforementioned symmetry axis 38. A base or hypotenuse 47 of the imaginary isosceles right triangle 46 coincides with the short side of the contour of the display enclosure 15. The base 47 of the imaginary isosceles right triangle 46 is fixed to the fixation plate 32, namely the hinge bracket 25. Legs 48 of the imaginary isosceles right triangle 46 are fixed to the rotating plate 37, namely the display enclosure 15. The ends of the legs 48 correspond to the vertexes of the two base angles, namely a vertex 46b of a first base angle and a vertex 46c of a second base angle. When the vertex 46b of the first base angle traces the base 47 to reach the vertex 46c of the second base angle in response to the rotation of the rotating plate 37, the first outward cam surface 43 is kept in contact with the guide shaft 36. As is apparent from FIG. 8, when the rotating plate 37 rotates from the reference attitude, the longitudinal axis of the cylinder 35 moves on the reference straight line 34. The cylinder 35 gets farther from one end of the guide opening 33, namely the guide shaft 36. When the rotating plate 37 rotates by plus 45 degrees, as shown in FIG. 8, the vertex 46b of the first base angle is located on the intersection between the base 47 and the reference straight line 34. The cylinder 35 is set at the position farthest from the one end of the guide opening 33, namely the guide shaft 36. As is apparent from FIG. 9, as rotation angle of the rotating plate 37 increases from plus 45 degrees to plus 90 degrees, the cylinder 35 gets closer to the one end of the guide opening 33, namely the guide shaft 36. When the rotation angle of the rotating plate 37 reaches plus 90 degrees, as shown in FIG. 9, the vertex 46b of the first base angle reaches the vertex 46c of the second base angle on the base 47. Such movement of the vertex 46b is guided based on contact between the first outward cam surface 43 and the guide shaft 36. On the other hand, when the vertex 46c of the second base angle traces the base 47 to reach the vertex 46b of the first base angle in response to the rotation of the rotating plate 37, the second outward cam surface 44 is kept in contact with the guide shaft 36. When the rotating plate 37 rotates from the reference attitude, the longitudinal axis of the cylinder 35 moves on the reference straight line 34 in the same manner as described above. The cylinder 35 gets farther from one end of the guide opening 33, namely the guide shaft 36. When the rotating plate 37 rotates by plus 45 degrees in the same manner as described above, the vertex 46c of the second base angle is located on the intersection between the base 47 and the reference straight line 34. The cylinder 35 is set at the position farthest from the one end of the guide opening 33, anemly the guide shaft 36. As is apparent from FIG. 10, as the rotation angle of the rotating plate 37 increases from minus 45 degrees to minus 90 degrees, the cylinder 35 moves closer to the one end of the guide opening 33, namely the guide shaft 36. When the rotation angle of the rotating plate 37 reaches minus 90 degrees, as shown in FIG. 10, the vertex 46c of the second base angle reaches the vertex 46b of the first base angle on the base 47. Such movement of the vertex 46c is guided based on contact between the second outward cam surface 44 and the guide shaft 36.

Figure 11:
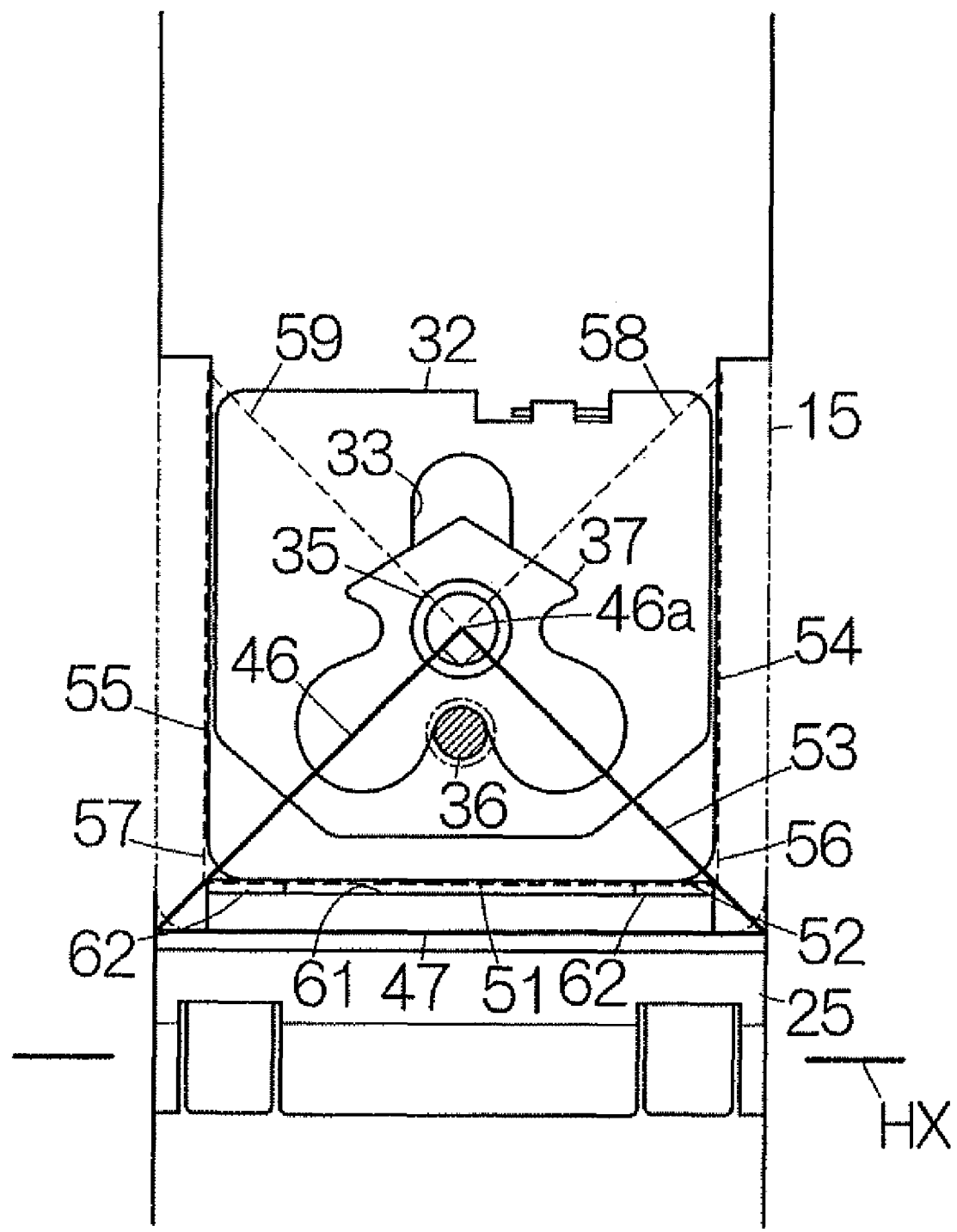
FIG. 11 is a plan view schematically illustrating the structure of first, second and third flat surfaces.

As shown in FIG. 11, a first flat surface 51 is defined on the backside of the display enclosure 15. The first flat surface 51 faces outward relative to the longitudinal axis of the cylinder 35. The first flat surface 51 is located inside the contour of the display enclosure 15. The first flat surface 51 extends in parallel with the longitudinal axis of the cylinder 35. The first flat surface 51 extends on a first straight line 52 along an imaginary plane perpendicular to the longitudinal axis of the cylinder 35. When the rotating plate 37 is set in the reference attitude, the first straight line 52 extends in parallel with the base 47 of the imaginary isosceles right triangle 46. The first straight line 52 and the longitudinal axis of the cylinder body 35 in combination establish an imaginary isosceles right triangle 53. The first straight line 52 corresponds to the base of the imaginary isosceles right triangle 53. The vertex of the vertical or right angle of the imaginary isosceles right triangle 53 is located on the longitudinal axis of the cylinder 35.

Likewise, second and third flat surfaces 54, 55 are defined on the backside of the display enclosure 15. The second and third flat surfaces 54, 55 face relative to the longitudinal axis of the cylinder 35. The second and third flat surfaces 54, 55 are located inside the contour of the display enclosure 15. The second and third flat surfaces 54, 55 extend in parallel with the longitudinal axis of the cylinder 35. The second flat surface 54 extends on a second straight line 56 along the aforementioned imaginary plane perpendicular to the longitudinal axis of the cylinder 35. The second straight line 56 intersects with the aforementioned first straight line 52 at right angles at one end of the first straight line 52. The third flat surface 55 extends on a third straight line 57 along the aforementioned imaginary plane perpendicular to the longitudinal axis of the cylinder 35. The third straight line 57 intersects with the aforementioned first straight line 52 at right angles at the other end of the first straight line 52. The second straight line 56 and the third straight line 57 thus extend in parallel with each other. The second straight line 56 and the longitudinal axis of the cylinder 35 in combination establish an imaginary isosceles right triangle 58 isomorphic to the imaginary isosceles right triangle 53 in the same manner as described above. Likewise, the third straight line 57 and the longitudinal axis of the cylinder 35 in combination establish an imaginary isosceles right triangle 59. The second straight line 56 and the third straight line 57 correspond to the bases of the imaginary isosceles right triangles 58, 59, respectively. The vertexes of the vertical or right angles of the imaginary isosceles right triangle 58, 59 is located on the longitudinal axis of the cylinder 35.

A flat receiving surface 61 is defined on the front surface of the hinge bracket 25. The flat receiving surface 61 faces inward relative to the longitudinal axis of the cylinder 35. The flat receiving surface 61 is located at a position behind the display enclosure 15. The flat receiving surface 61 extends in parallel with the longitudinal axis of the cylinder 35. When the display enclosure 15 is set in the upright attitude, namely when the rotating plate 37 is set in the reference attitude, the flat receiving surface 61 is opposed to the first flat surface 51 at a predetermined interval. In other words, the flat receiving surface 61 extends in parallel with the first flat surface 51.

A pair of receiving pads 62, 62 is placed on the flat receiving surface 61. The receiving pads 62, 62 may be spaced from each other at a predetermined interval. When the display enclosure 15 is set in the upright attitude, the opposite ends of the first flat surface 51 are received on the receiving pads 62. The first flat surface 51 is urged against the receiving pads 62 with the assistance of the elastic force of the torsion spring 39. One of the receiving pads 62 serves to receive a torque generated around the longitudinal axis of the cylinder 35 in a first direction, namely in the clockwise direction. The other of the receiving pads 62 serves to receive a torque generated around the longitudinal axis of the cylinder 35 in a second direction reverse to the first direction, namely in the anticlockwise direction. The display enclosure 15 is thus reliably held in the upright attitude with the assistance of the elastic force.

Figure 12:
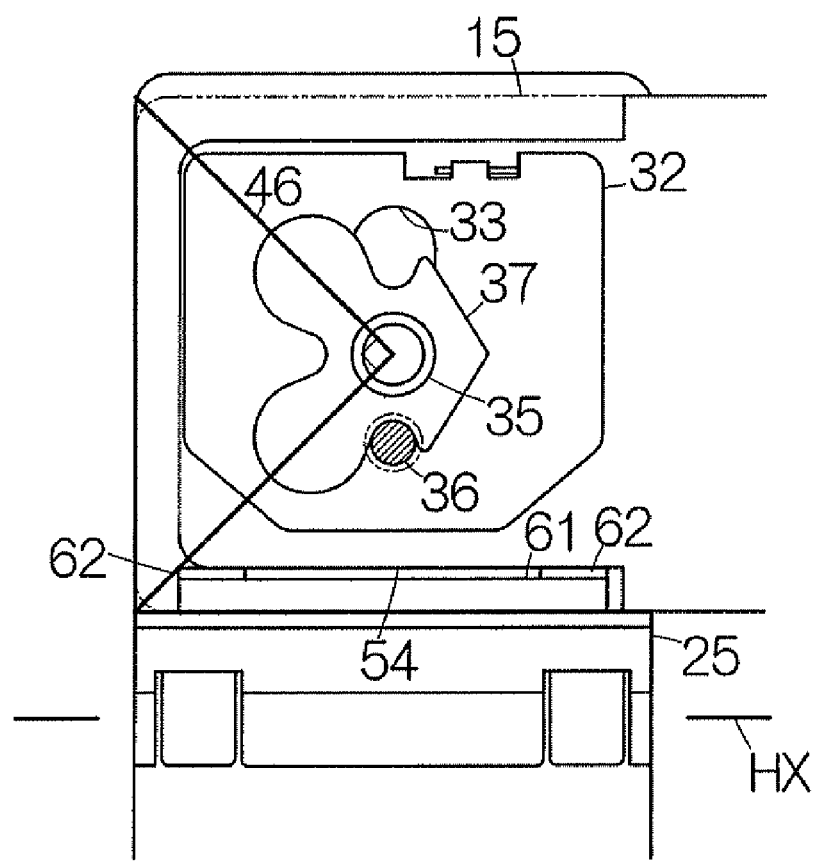
FIG. 12 is a plan view schematically illustrating the positional relationship between the second flat surface of the display enclosure and a receiving surface or flat surface defined in the hinge bracket.

Now, as shown in FIG. 12, when the display enclosure 15 is set in the first lateral attitude, in other words, when the rotating plate 37 rotates around the longitudinal axis of the cylinder 35 by plus 90 degrees in the clockwise direction, for example, the second flat surface 54 is opposed to the flat receiving surface 61 at a predetermined interval. The second flat surface 54 extends in parallel with the flat receiving surface 61. The opposite ends of the second flat surface 54 are thus received on the receiving pads 62, 62, respectively. The second flat surface 54 is urged against the receiving pads 62, 62 based on the elastic force of the torsion spring 39. One of the receiving pads 62 serves to receive a torque generated around the longitudinal axis of the cylinder 35 in the clockwise direction. The other of the receiving pads 62 serves to receive a torque generated around the longitudinal axis of the cylinder 35 in the anticlockwise direction. The display enclosure 15 is thus reliably held in the first lateral attitude with the assistance of the elastic force.

Figure 13:
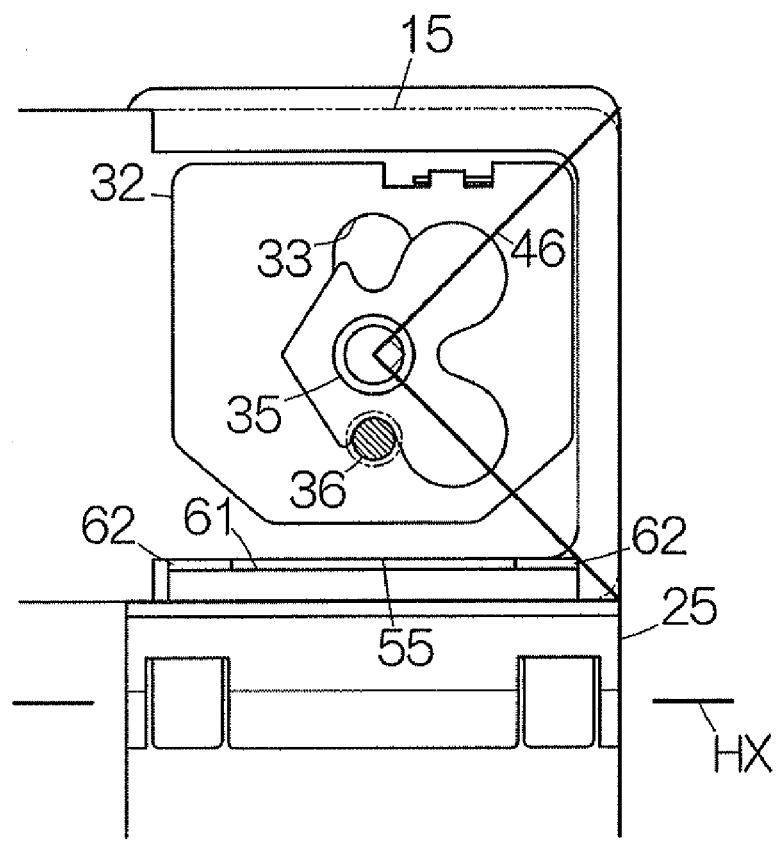
FIG. 13 is a plan view schematically illustrating a positional relationship between the third flat surface of the display enclosure and a flat receiving surface defined on the hinge bracket.

As shown in FIG. 13, for example, when the display enclosure 15 is set in the second lateral attitude, in other words, when the rotating plate 37 rotates around the longitudinal axis of the cylinder 35 by minus 90 degrees in the anticlockwise direction, for example, the third flat surface 55 is opposed to the flat receiving surface 61 at a predetermined interval. The third flat surface 55 extends in parallel with the flat receiving surface 61. The opposite ends of the third flat surface 55 are thus received on the receiving pads 62, 62, respectively. The third flat surface 55 is urged against the receiving pads 62, 62 based on the elastic force of the torsion spring 39. One of the receiving pads 62 serves to receive a torque generated around the longitudinal axis of the cylinder 35 in the clockwise direction. The other of the receiving pads 62 serves to receive a torque generated around the longitudinal axis of the cylinder 35 in the anticlockwise direction. The display enclosure 15 is thus reliably held in the second lateral attitude with the assistance of the elastic force.

Figure 14:
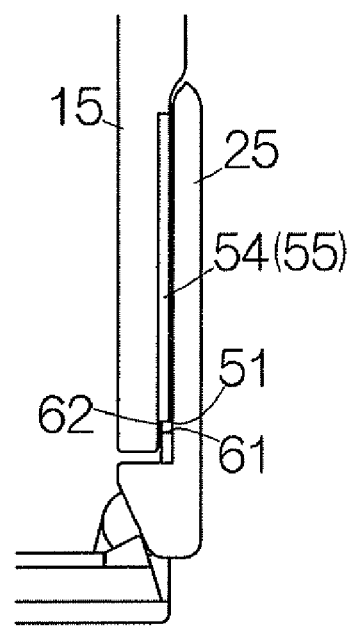
FIG. 14 is a partial side view of the mobile phone terminal, schematically illustrating the dimensions of the first, second and third flat surfaces and the flat receiving surface.

As described above, the first flat surface 51, the second flat surface 54 or the third flat surface 55 contacts against the receiving pads 62. Friction resulting from the contact serves to roughen the first flat surface 51, the second flat surface 54 or the third flat surface 55. If the display enclosure 15 rotates a considerable times during usage of the mobile phone terminal 11, the first flat surface 51, the second flat surface 54 and the third flat surface 55 suffer from asperity and scratches, for example. Since the first flat surface 51, the second flat surface 54 and the third flat surface 55 are placed behind the display enclosure 15, asperity and scratches can be hidden behind the display enclosure 15. The user of the mobile phone terminal 11 is allowed to keep enjoying a good appearance of the display enclosure 15. Here, as shown in FIG. 14, the first flat surface 51, the second flat surface 54, the third flat surface 55, the flat receiving surface 61 and the receiving pads 62 preferably have dimensions significantly smaller than the thickness of the display enclosure 15. The first flat surface 51, the second flat surface 54, the third flat surface 55, the flat receiving surface 61 and the receiving pads 62 of smaller dimensions serve to further reliably hide the asperity and scratches. The display enclosure 15 is thus allowed to keep a good appearance. The display enclosure 15 is reliably held in the upright attitude, the first lateral attitude or the second lateral attitude.

Figure 15:
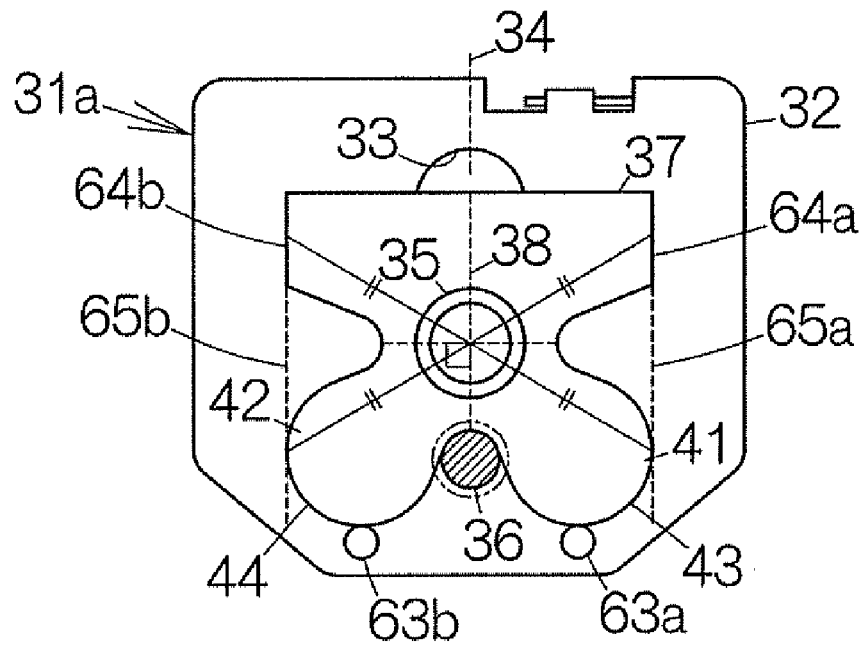
FIG. 15 is an enlarged plan view of a coupling unit according to a second embodiment of the present invention.

FIG. 15 schematically illustrates a coupling unit 31a according to a second embodiment of the present invention. The coupling unit 31a includes a pair of protrusions 63a, 63b formed on the front surface of the fixation plate 32. The protrusions 63a, 63b are placed symmetric to each other relative to the reference straight line 34 at positions outside the guide opening 33. The protrusions 63a, 63b are designed to simultaneously receive the edge of the rotating plate 37 in the reference attitude, namely to simultaneously receive the first outward cam surface 43 and the second outward cam surface 44, respectively. The rotating plate 37 is urged against the protrusions 63a, 63b based on the elastic force of the torsion spring 39. The protrusion 63a serves to receive a torque generated around the longitudinal axis of the cylinder 35 in the first direction or in the clockwise direction. The protrusions 63b serves to receive a torque generated around the longitudinal axis of the cylinder 35 in the second direction, reverse to the first direction, or in the anticlockwise direction. The display enclosure 15 is thus reliably held in the upright attitude with the assistance of the elastic force.

A pair of contact edges 64a, 64b is defined on the rotating plate 37. The contact edges 64a, 64b are formed symmetric to each other with respect to the symmetry axis 38. The contact edges 64a, 64b extend on corresponding straight lines in parallel with the symmetry axis 38, respectively. An extension 65a of the contact edge 64a contacts with the first outward cam surface 43. An isosceles triangle is established based on the point of tangency between the first outward cam surface 43 and the extension 65a, a certain point on the contact edge 64a, and the longitudinal axis of the cylinder 35. The longitudinal axis of the cylinder 35 serves to specify the vertex of the vertical angle of the isosceles triangle. The interval between the vertexes of the base angles is set equal to the interval between the protrusions 63a, 63b. Likewise, an extension 65b of the contact edge 64b contacts with the second outward cam surface 44. An isosceles triangle is established based on the point of tangency between the second outward cam surface 44 and the extension 65b, a certain point on the contact edge 64b, and the longitudinal axis of the cylinder 35. The longitudinal axis of the cylinder 35 serves to specify the vertex of the vertical angle of the isosceles triangle. The interval between the vertexes of the base angles is set equal to the interval between the protrusions 63a, 63b. In the second embodiment, the aforementioned first flat surface 51, the second flat surface 54, the third flat surface 55, the flat receiving surface 61 and the receiving pads 62 are omitted. Like reference numerals are attached to the structure or components equivalent to those of the aforementioned first embodiment.

Figure 16:
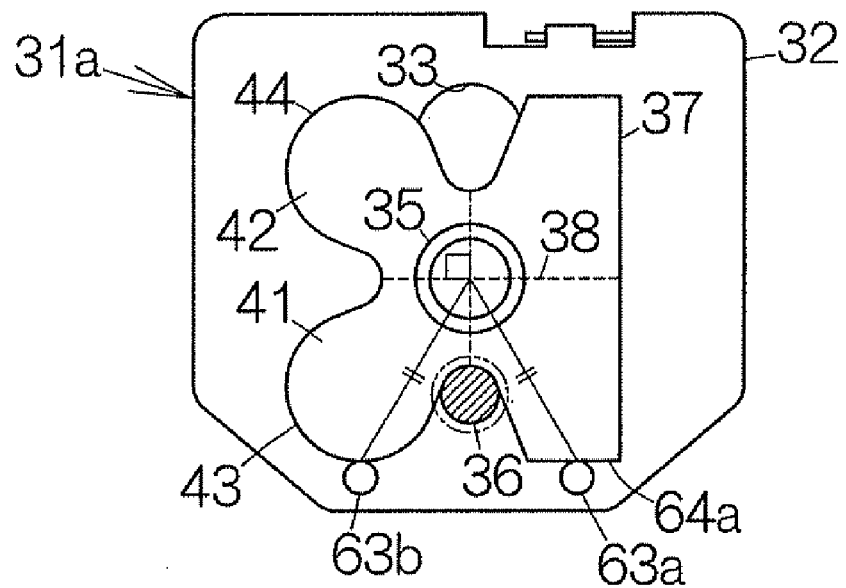
FIG. 16 is an enlarged plan view schematically illustrating the relationships between the first outward cam surface and a protrusion and between a contact edge and a protrusion.

As shown in FIG. 16, when the rotating plate 37 rotates around the longitudinal axis of the cylinder 35 by plus 90 degrees in the clockwise direction from the reference attitude, in other words, when the display enclosure 15 is set in the first lateral attitude, the first outward cam surface 43 and the contact edge 64a are received on the protrusions 63b, 63a at the vertexes of the base angles of the isosceles triangle, respectively. The first outward cam surface 43 and the contact edge 64a are urged against the protrusions 63b, 63a, respectively, based on the elastic force of the torsion spring 39. The protrusion 63a serves to receive a torque generated around the longitudinal axis of the cylinder 35 in the clockwise direction. The protrusion 63b serves to receive a torque generated around the longitudinal axis of the cylinder 35 in the anticlockwise direction. The display enclosure 15 is thus reliably held in the first lateral attitude with the assistance of the elastic force.

Figure 17:
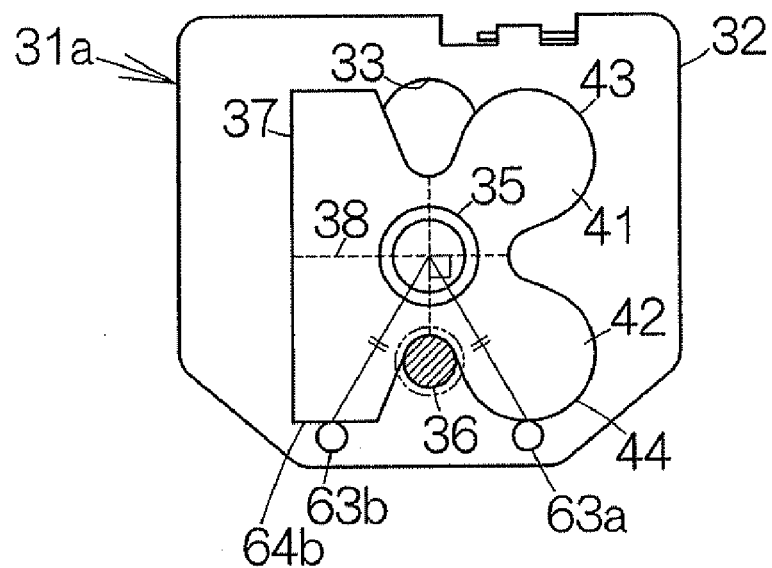
FIG. 17 is an enlarged plan view schematically illustrating the relationships between a second outward cam surface and the protrusion and between a contact edge and the protrusion.

As shown in FIG. 17, when the rotating plate 37 rotates around the longitudinal axis of the cylinder 35 by minus 90 degrees in the anticlockwise direction from the reference attitude, in other words, when the display enclosure 15 is set in the second lateral attitude, for example, the second outward cam surface 44 and the contact edge 64b are received on the protrusions 63a, 63b at the vertexes of the base angles of the isosceles triangle, respectively. The second outward cam surface 44 and the contact edge 64b are urged against the protrusion 63a, 63b, respectively, based on the elastic force of the torsion spring 39. The protrusion 63a serves to receive a torque generated around the longitudinal axis of the cylinder 35 in the clockwise direction. The protrusions 63b serves to receive a torque generated around the longitudinal axis of the cylinder 35 in the anticlockwise direction. The display enclosure 15 is thus reliably held in the second lateral attitude with the assistance of the elastic force.

The coupling unit 31a allows the protrusions 63a, 63b on the fixation plate 32 to receive the edge of the rotating plate 37 when the display enclosure 15 is set in the first or second lateral attitude. The display enclosure 15 is thus prevented from contacting with the hinge bracket 25. The surfaces of the display enclosure 15 and the hinge bracket 25 are prevented from suffering from generation of asperity and scratches. The user of the mobile phone terminal 11 is allowed to keep enjoying a good appearance of the display enclosure 15 in the mobile phone terminal 11.

Figure 18:
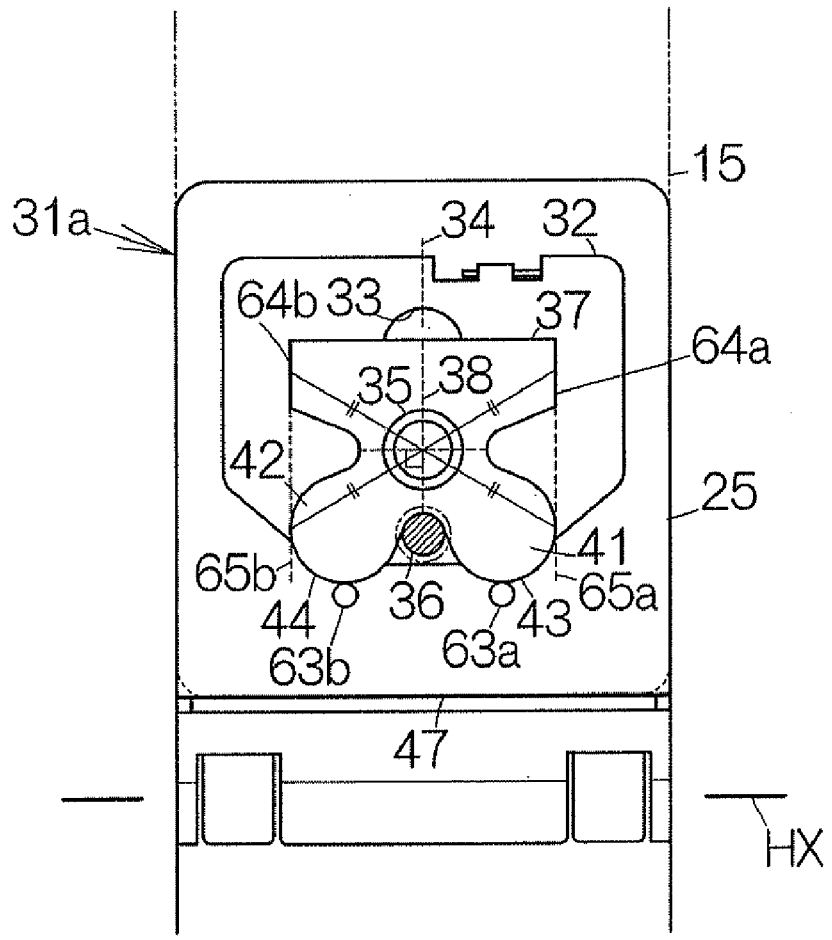
FIG. 18 is an enlarged plan view of a coupling unit according to a modified example of the second embodiment.

It should be noted that the coupling unit 31a is allowed to include the protrusions 63a, 63b disposed on the main body enclosure 14 according to the second embodiment, as shown in FIG. 18, for example. The protrusions 63a, 63b may be formed integral with the main body enclosure 14. The protrusions 63a, 63b on the main body enclosure 14 enables the positioning of the protrusions 63a, 63b on the main body enclosure 14 relative to the first rotation axis HX with higher accuracy, for example, as compared with the case where the protrusions 63a, 63b are placed on the fixation plate 32 in the aforementioned manner. This results in establishment of the upright attitude, the first lateral attitude and the second lateral attitude of the display unit 13 at accurate positions relative to the main body 12.

Figure 19:
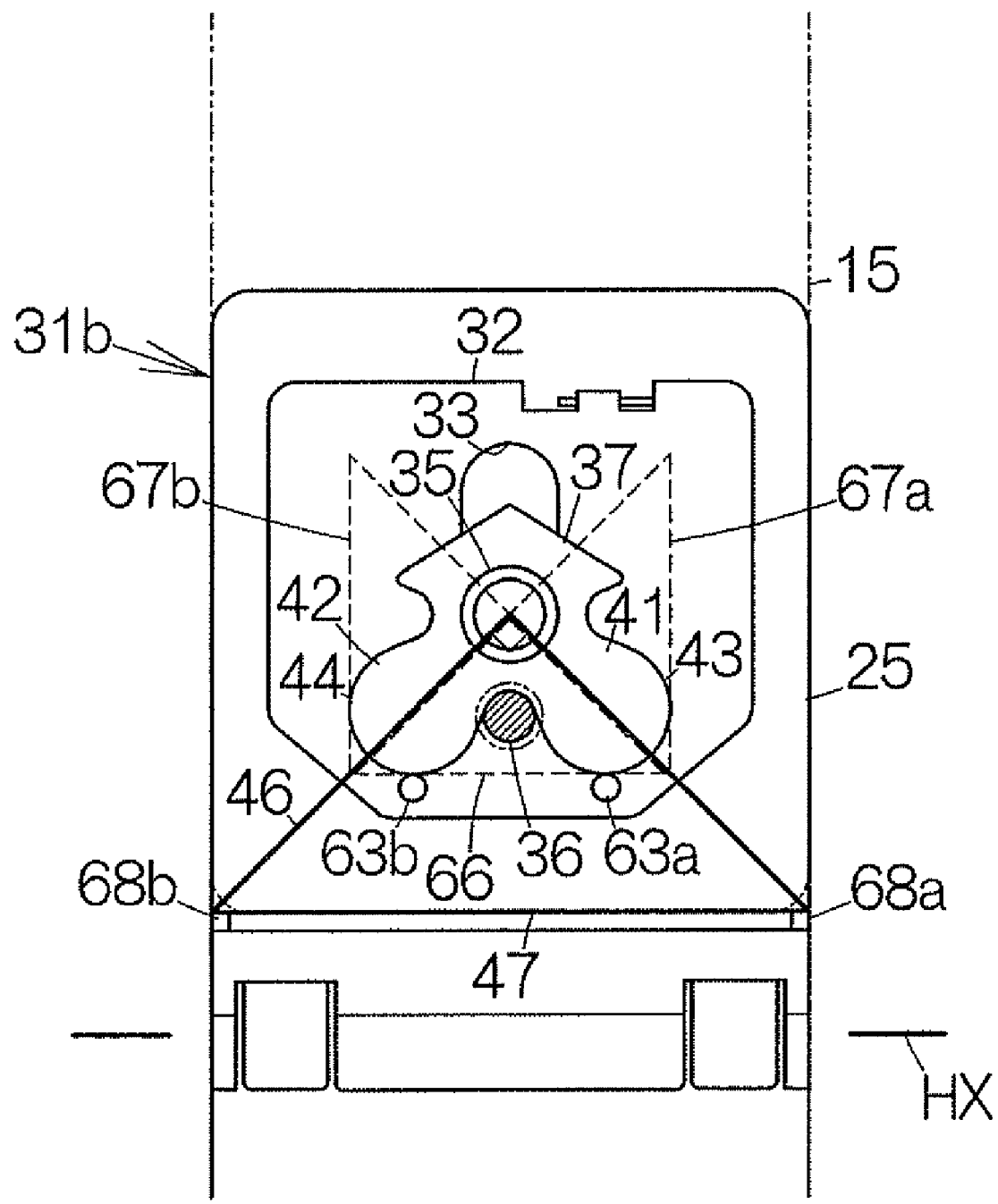
FIG. 19 is an enlarged plan view of a coupling unit according to a third embodiment of the present invention.

FIG. 19 schematically illustrates a coupling unit 31b according to a third embodiment of the present invention. The coupling unit 31b includes a pair of the protrusions 63a, 63b formed on the front surface of the fixation plate 32 in the same manner as described above. A common tangent 66 is defined on the rotating plate 37. The common tangent 66 is designed to simultaneously contact with the first outward cam surface 43 and the second outward cam surface 44. The common tangent 66 and the longitudinal axis of the cylinder 35 in combination establish an imaginary isosceles right triangle. The longitudinal axis of the cylinder 35 serves to specify the vertex of the vertical angle of the imaginary isosceles right triangle. Two isomorphic imaginary isosceles right triangles are also established on the rotating plate 37 based on the legs of the imaginary isosceles right triangle. Here, the legs of the imaginary isosceles right triangle function as symmetry axes. The bases 67a, 67b of the isomorphic imaginary isosceles right triangles are designed to contact with the first outward cam surface 43 and the second outward cam surface 44, respectively. The rotating plate 37 is designed to contact with the bases 67a, 67b only at the first outward cam surface 43 and the second outward cam surface 44. Specifically, the aforementioned contact edges 64a, 64b are omitted from the rotating plate 37 of the coupling unit 31b.

The protrusion 63a is designed to contact with the first outward cam surface 43 at the point of tangency between the first cam surface 43 and the common tangent 66 specified on the rotating plate 37 set in the reference attitude. The protrusion 63b is designed to contact with the second outward cam surface 44 at the point of tangency between the second outward cam surface 44 and the common tangent 66 specified on the rotating plate 37 set in the reference attitude. The protrusions 63a, 63b thus serve to simultaneously receive the edge of the rotating plate 37 in the reference attitude, namely the first outward cam surface 43 and the second outward cam surface 44, respectively. The rotating plate 37 is urged against the protrusions 63a, 63b based on the elastic force of the torsion spring 39. The protrusion 63a serves to receive a torque generated around the longitudinal axis of the cylinder 35 in the first direction or in the clockwise direction. The protrusions 63b serves to receive a torque generated around the longitudinal axis of the cylinder 35 in the second direction, reverse to the first direction, or in the anticlockwise direction. The display enclosure 15 is thus reliably held in the upright attitude with the assistance of the elastic force.

First and second protruding pieces 68a, 68b are formed on the hinge bracket 25. The first and second protruding pieces 68a, 68b are designed to contact with the base 47 of the imaginary isosceles right triangle 46, specified on the rotating plate 37 set in the reference attitude, from the outside of the imaginary isosceles right triangle 46. It should be noted that a predetermined space is established between the first and second protruding pieces 68a, 68b and the contour of the display enclosure 15. Splays are formed on the contour of the display enclosure 15 at the corners so as to establish such a space. The splays may form a curved surface. The splays at the corners of the contour serves to prevent the display enclosure 15 from contacting with the first and second protruding pieces 68a, 68b when the rotating plate 37 is set in the reference attitude. Like reference numerals are attached to the structure or components equivalent to those of the aforementioned first and second embodiments.

Figure 20:
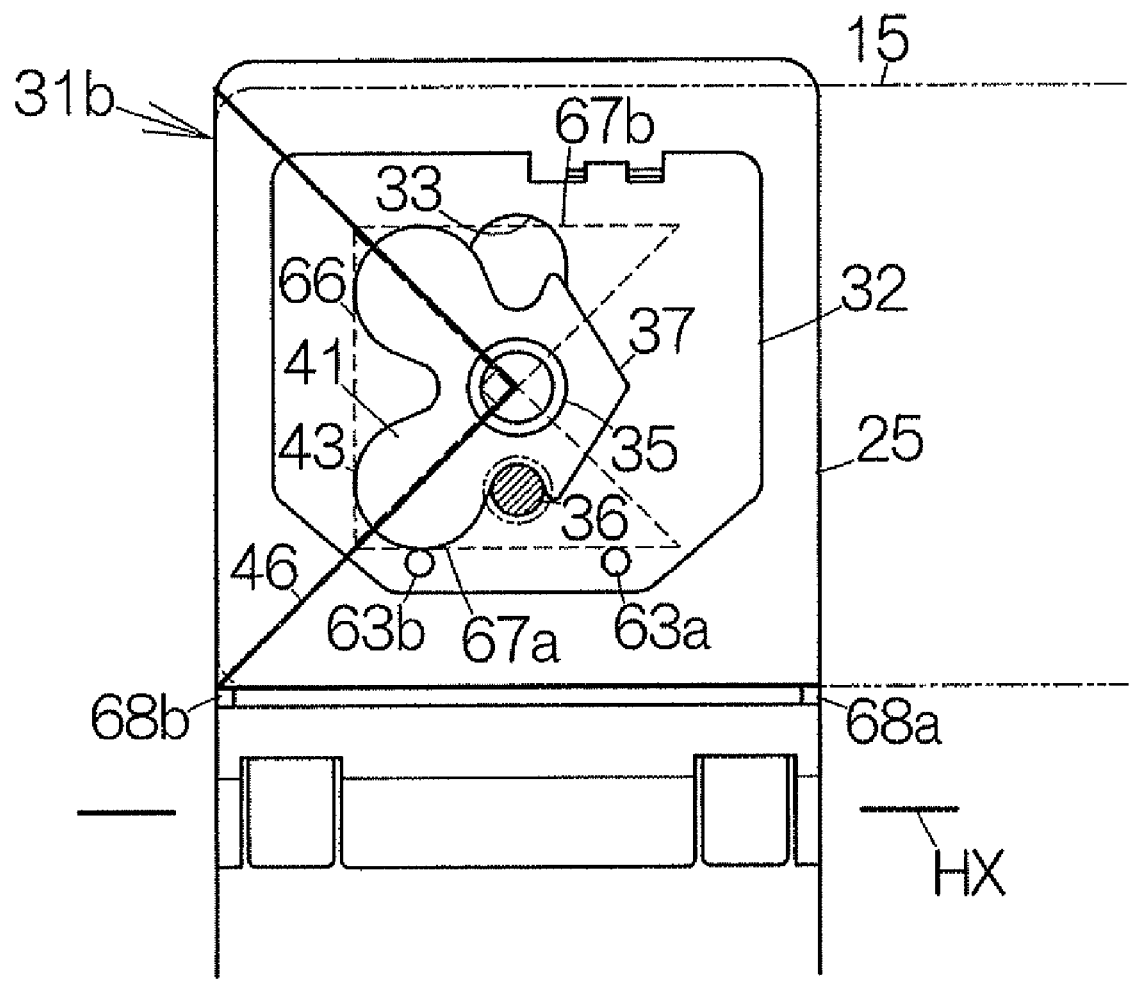
FIG. 20 is an enlarged plan view schematically illustrating the relationships between a first outward cam surface and the contour of the display enclosure and between the protrusion and a first protruding piece.

Now, when the display enclosure 15 is set in the first lateral attitude, in other words, when the movable plate 37 rotates around the longitudinal axis of the cylinder 35 by plus 90 degrees in the clockwise direction, as shown in FIG. 20, for example, the first outward cam surface 43 is received on the second protrusion 63b. The long side of the display enclosure 15 is simultaneously received on the first protruding piece 68a. The first protruding piece 68a serves to receive a torque generated around the longitudinal axis of the cylinder 35 in the clockwise direction. The protrusion 63b serves to receive a torque generated around the longitudinal axis of the cylinder 35 in the anticlockwise direction. The first outward cam surface 43 and the display enclosure 15 are urged against the protrusion 63b and the first protruding piece 68a, respectively, based on the elastic force of the torsion spring 39. The display enclosure 15 is thus reliably held in the first lateral attitude with the assistance of the elastic force.

Figure 21:
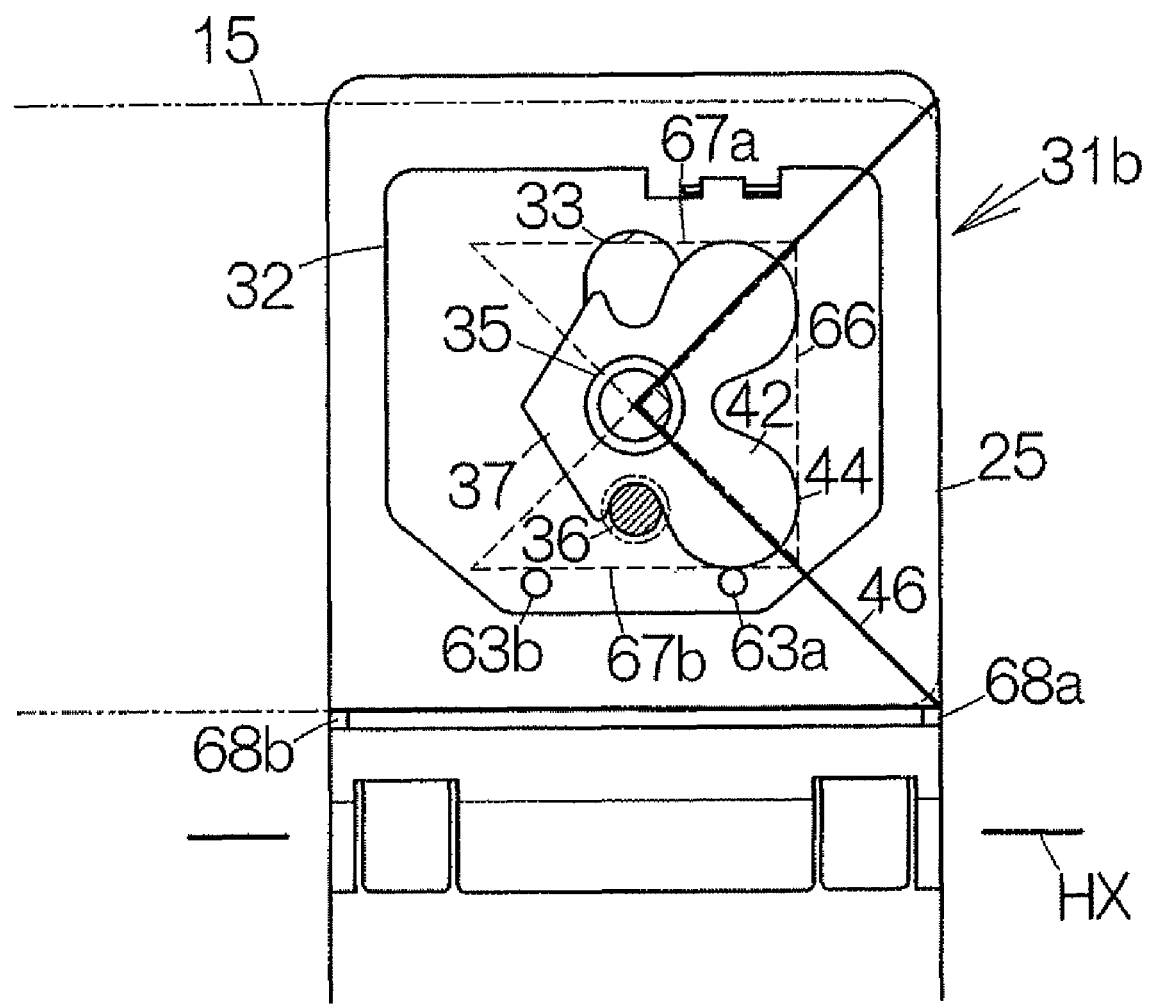
FIG. 21 is an enlarged plan view schematically illustrating the relationships between a second outward cam surface and the contour of the display enclosure and between the protrusion and a second protruding piece.

Now, when the display enclosure 15 is set in the second lateral attitude, in other words, when the rotating plate 37 rotates around the longitudinal axis of the cylinder 35 by minus 90 degrees in the anticlockwise direction, as shown in FIG. 21, for example, the second outward cam surface 44 is received on the first protrusion 63a. The long side of the display enclosure 15 is simultaneously received on the second protruding piece 68b. The protrusion 63a serves to receive a torque generated around the longitudinal axis of the cylinder 35 in the clockwise direction. The second protruding piece 68b serves to receive a torque generated around the longitudinal axis of the cylinder 35 in the anticlockwise direction. The second outward cam surface 44 and the display enclosure 15 are urged against the protrusion 63a and the second protruding piece 68b, respectively, based on the elastic force of the torsion spring 39. The display enclosure 15 is thus reliably held in the second lateral attitude with the assistance of the elastic force.

The coupling unit 31b allows the display enclosure 15 to contact only with the first protruding piece 68a when the display enclosure 15 is set in the first lateral attitude. On the other hand, when the display enclosure 15 is set in the second lateral attitude, the display enclosure 15 is allowed to contact only with the second protruding piece 68b. The number of times of contact between the display enclosure 15 and the hinge bracket 25 is significantly suppressed. The surfaces of the display enclosure 15 and the hinge bracket 25 are thus reliably prevented from suffering from generation of asperity and scratches to the utmost. The display enclosure 15 is thus allowed to keep a good appearance in the mobile phone terminal 11.

Figure 22:
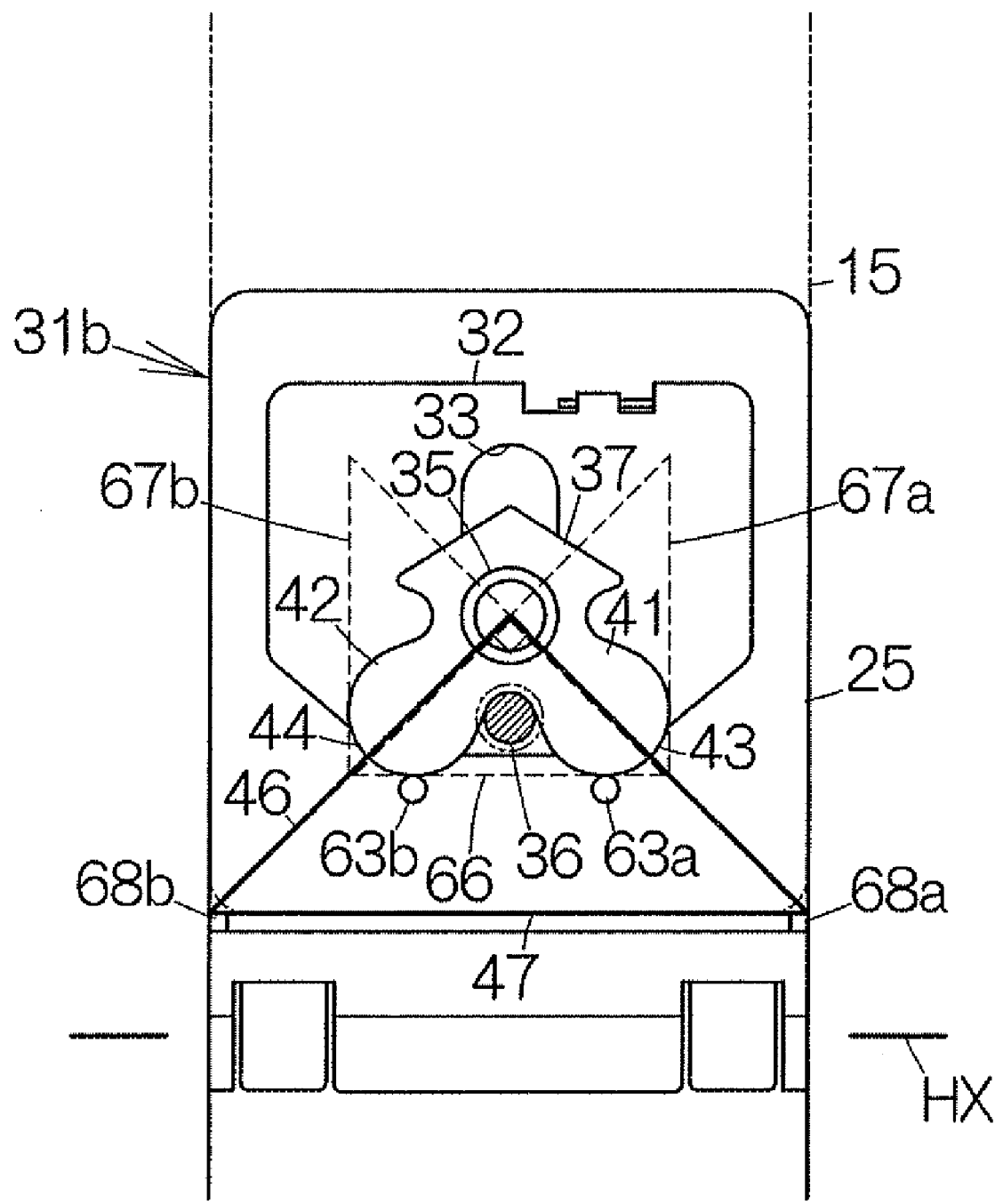
FIG. 22 is an enlarged plan view of a coupling unit according to a modified example of the third embodiment.

It should be noted that the coupling unit 31b is allowed to include the protrusions 63a, 63b disposed on the main body enclosure 14 according to the third embodiment, as shown in FIG. 22, for example. The protrusions 63a, 63b may be formed integral with the main body enclosure 14. The protrusions 63a, 63b on the main body enclosure 14 enables the positioning of the protrusions 63a, 63b on the main body enclosure 14 relative to the first rotation axis HX or the first and second protruding pieces 68a, 68b with higher accuracy, for example, as compared with the case where the protrusions 63a, 63b are placed on the fixation plate 32 in the aforementioned manner. This results in establishment of the upright attitude, the first lateral attitude, the second lateral attitude of the display unit 13 at accurate positions relative to the main body 12.

Figure 23:
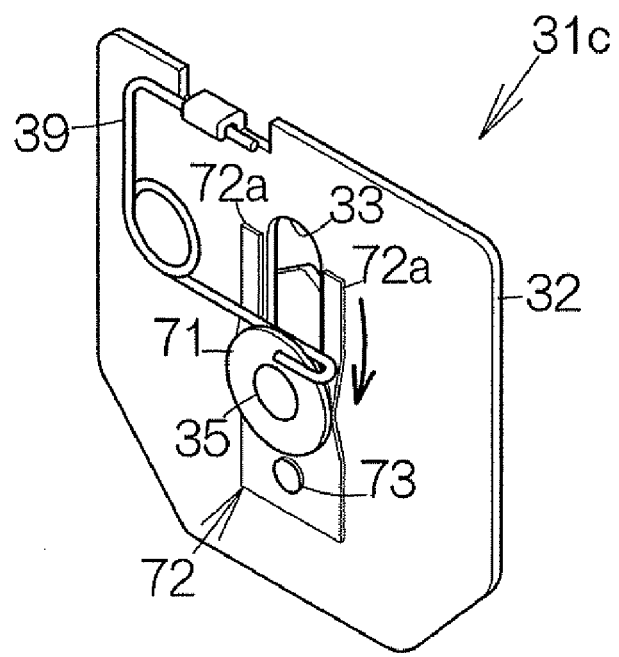
FIG. 23 is an enlarged perspective view of a coupling unit according to a fourth embodiment of the present invention.

FIG. 23 schematically illustrates a coupling unit 31c according to a fourth embodiment of the present invention. The coupling unit 31c includes a flange 71 coupled to the tip or distal end of the cylinder 35. The flange 71 may be formed integral with the cylinder 35. The flange 71 extends outward in the radial direction from the cylinder 35. The flange 71 serves to prevent the cylinder 35 from slipping out of the guide opening 33.

An elastic member, namely a leaf spring 72, is attached to the back surface of the fixation plate 32 at a position outside the guide opening 33. An attachment piece, such as a rivet 73, may be employed to attach the leaf spring 72 to the fixation plate 32, for example. The rivet 73 may also function as an attachment piece for the aforementioned guide shaft 36, for example. The leaf spring 72 includes plate pieces 72a extending in parallel with the guide opening 33 at positions outside the guide opening 33. When the cylinder 35 is positioned at one end of the guide opening 33, an area of elastic deformation of the plate piece 72a is interposed between the flange 71 and the back surface of the fixation plate 32. The plate piece 72a of the leaf spring 72 exhibits an elastic or resilient force for distancing the flange 71 farther away from the fixation plate 32. The leaf spring 72 thus serves to prevent rattling of the cylinder 35 when the display enclosure 15 is set in the upright attitude, the first lateral attitude or the second lateral attitude. The plate piece 72a is superposed on the back surface of the fixation plate 32 over a area off the area of elastic deformation. When the cylinder 35 moves away from the one end of the guide opening 33 during the rotation of the display enclosure 15, the flange 71 is released from a contact with the plate piece 72a. The cylinder 35 is thus allowed to smoothly move based on establishment of such a play. Like reference numerals are attached to the structure or components equivalent to those of the aforementioned first, second and third embodiments.

Figure 24:
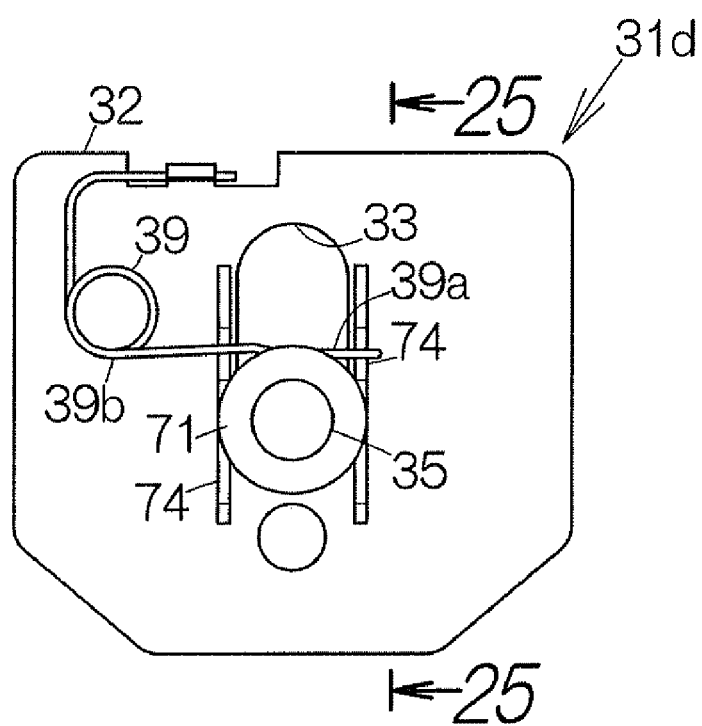
FIG. 24 is an enlarged plan view of a coupling unit according to a fifth embodiment of the present invention.

FIG. 24 schematically illustrates a coupling unit 31d according to a fifth embodiment of the present invention. The coupling unit 31d includes a pair of ribs 74 formed on the back surface of the fixation plate 32 at positions outside the guide opening 33. The ribs 74 protrude from the back surface of the fixation plate 32. Drawing process may be applied to the plate material of the fixation plate 32 to form the ribs 74, for example. The ribs 74 extend in parallel with the guide opening 33. The torsion spring 39 has an arm 39a contacting with the surfaces of the ribs 74. The arm 39a of the torsion spring 39 extends from a coil 39b. The arm 39a is engaged with the outer peripheral surface of the cylinder 35 at a position between the ribs 74. The arm 39a of the torsion spring 39 is subjected to an elastic or resilient force of the coil 39b. The elastic or resilient force induces an urging force for urging the cylinder 35 toward one end of the guide opening 33. The arm 39a of the torsion spring 39 is designed to slide along the surfaces of the ribs 74.

Figure 25:
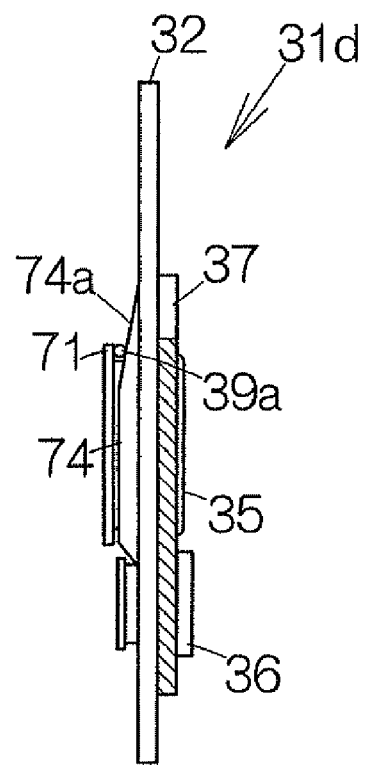
FIG. 25 is a sectional view taken along the line 25-25 in FIG. 24.

As is apparent from FIG. 25, the individual rib 74 defines an inclined surface 74a getting farther from the back surface of the fixation plate 32 as the position gets closer to the one end of the guide opening 33. When the cylinder 35 is positioned at the one end of the guide opening 33, the arm 39a of the torsion spring 39 is held between the flange 71 of the cylinder 35 and the surfaces of the ribs 74. The arm 39a of the torsion spring 39 pushes the flange 71 upward away from the back surface of the fixation plate 32 as the arm 39a of the torsion spring 39 slides upward along the inclined surfaces 74a of the ribs 74. The elastic force of the torsion spring 39 is applied to the flange 71 in a direction to distance the flange 71 away from the back surface of the fixation plate 32 in a space between the inclined surfaces 74a. The arm 39a thus serves to prevent rattling of the cylinder 35 when the display enclosure 15 is set in the upright attitude, the first lateral attitude or the second lateral attitude. As the cylinder 35 moves from the one end of the guide opening 33 to the other end of the guide opening 33, a space increases between the flange 71 and the surfaces of the ribs 74. The flange 71 is thus released from the elastic force of the torsion spring 39. The cylinder 35 is allowed to smoothly move. Like reference numerals are attached to the structure or components equivalent to those of the aforementioned first, second and third embodiments.

Figure 26:
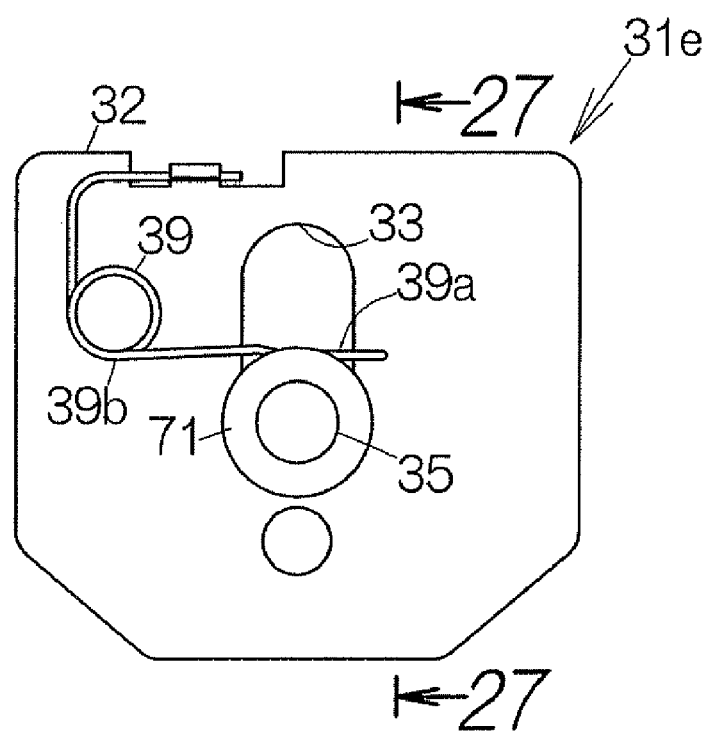
FIG. 26 is an enlarged plan view of a coupling unit according to a sixth embodiment of the present invention.

FIG. 26 schematically illustrates a coupling unit 31e according to a sixth embodiment of the present invention. The coupling unit 31e includes the arm 39a of the torsion spring 39 engaged with the outer peripheral surface of the cylinder 35. The arm 39a of the torsion spring 39 is designed to slide on the back surface of the fixation plate 32 along a movement path extending in parallel with the guide opening 33. Like reference numerals are attached to the structure or components equivalent to those of the aforementioned first to fifth embodiments.

Figure 27:
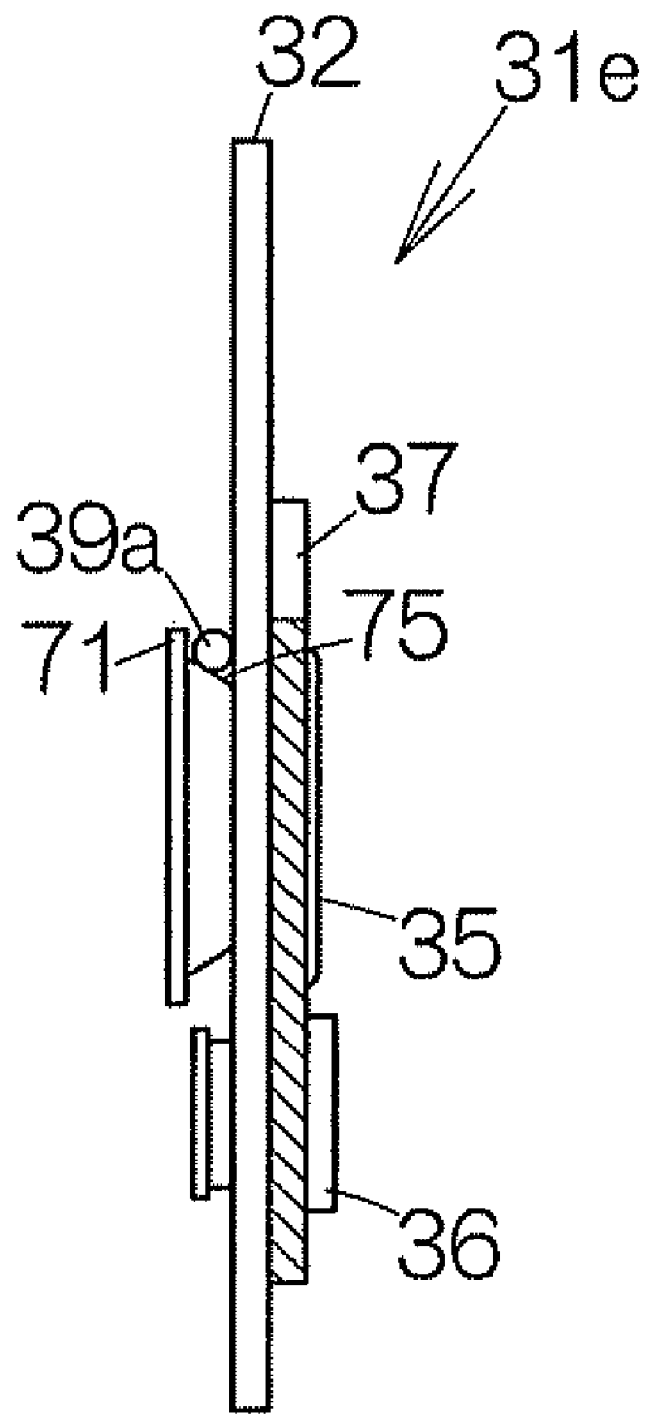
FIG. 27 is a sectional view taken along the line 27-27 in FIG. 26.

As shown in FIG. 27, the outer peripheral surface of the cylinder 35 is formed in the shape of a truncated cone concentric with the cylinder 35. The outer peripheral surface of the cylinder 35 defines an inclined surface 75 getting farther from the longitudinal axis of the cylinder 35 as the position gets farther from the back surface of the fixation plate 32. The arm 39a of the torsion spring 39 serves to apply an urging force to the inclined surface 75 toward one end of the guide opening 33. The inclined surface 75 serves to convert the urging force into a lift to urge the flange 71 upward away from the back surface of the fixation plate 32. The arms 39a of the torsion spring 39 serves to prevent rattling of the cylinder 35 when the display enclosure 15 is set in the upright attitude, the first lateral attitude or the second lateral attitude.

Figure 28:
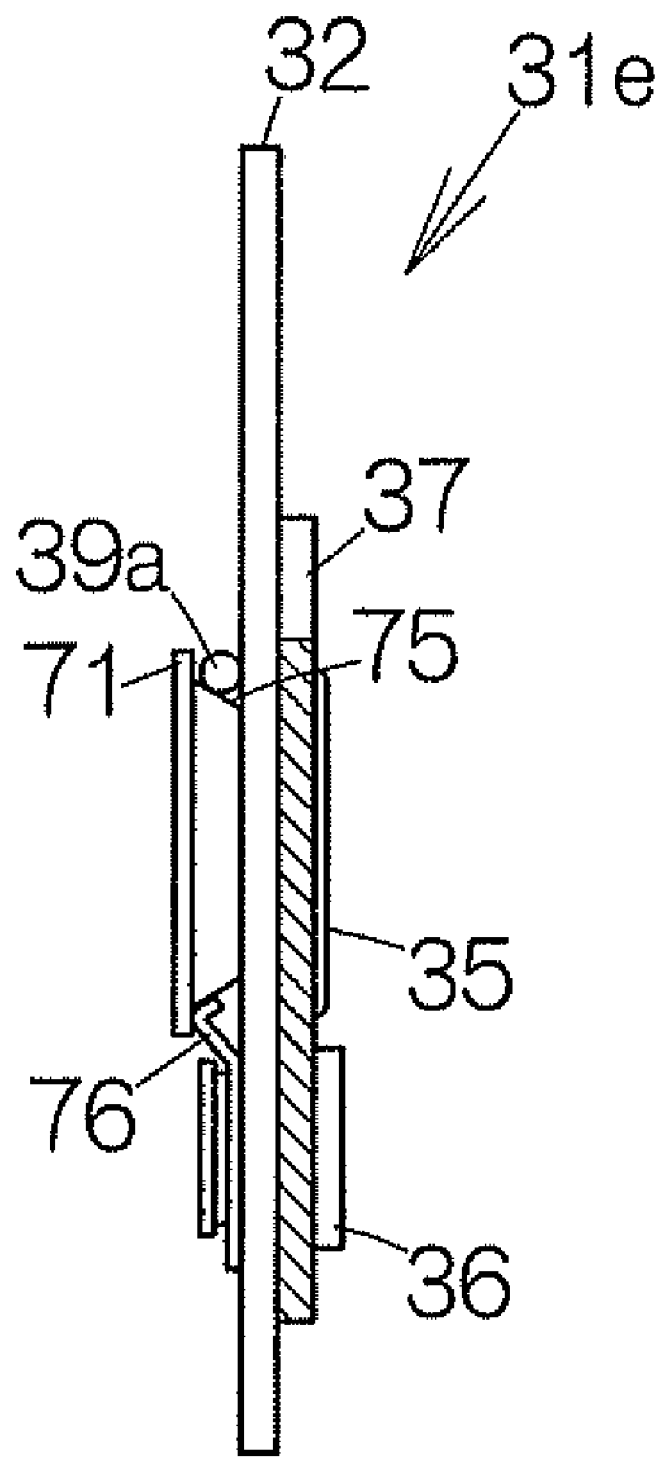
FIG. 28 is a sectional view, corresponding to FIG. 27, schematically illustrating a coupling unit according to a modified example of the sixth embodiment.

As shown in FIG. 28, an elastic member, namely a leaf spring 76, may be attached to the back surface of the fixation plate 32 at a position outside the one end of the guide opening 33, for example. The leaf spring 76 exhibits an elastic or resilient force to distance the flange 71 away from the fixation plate 32. The leaf spring 76 is set to have an elastic force set to balance with the aforementioned lift generated at the inclined surface 75. The cylinder 35 is set to equally receive elastic forces, to distance the flange 71 away from the fixation plate 32, from the torsion spring 39 and the leaf spring 76. Inclination of the cylinder 35 is thus prevented.

Figure 29:
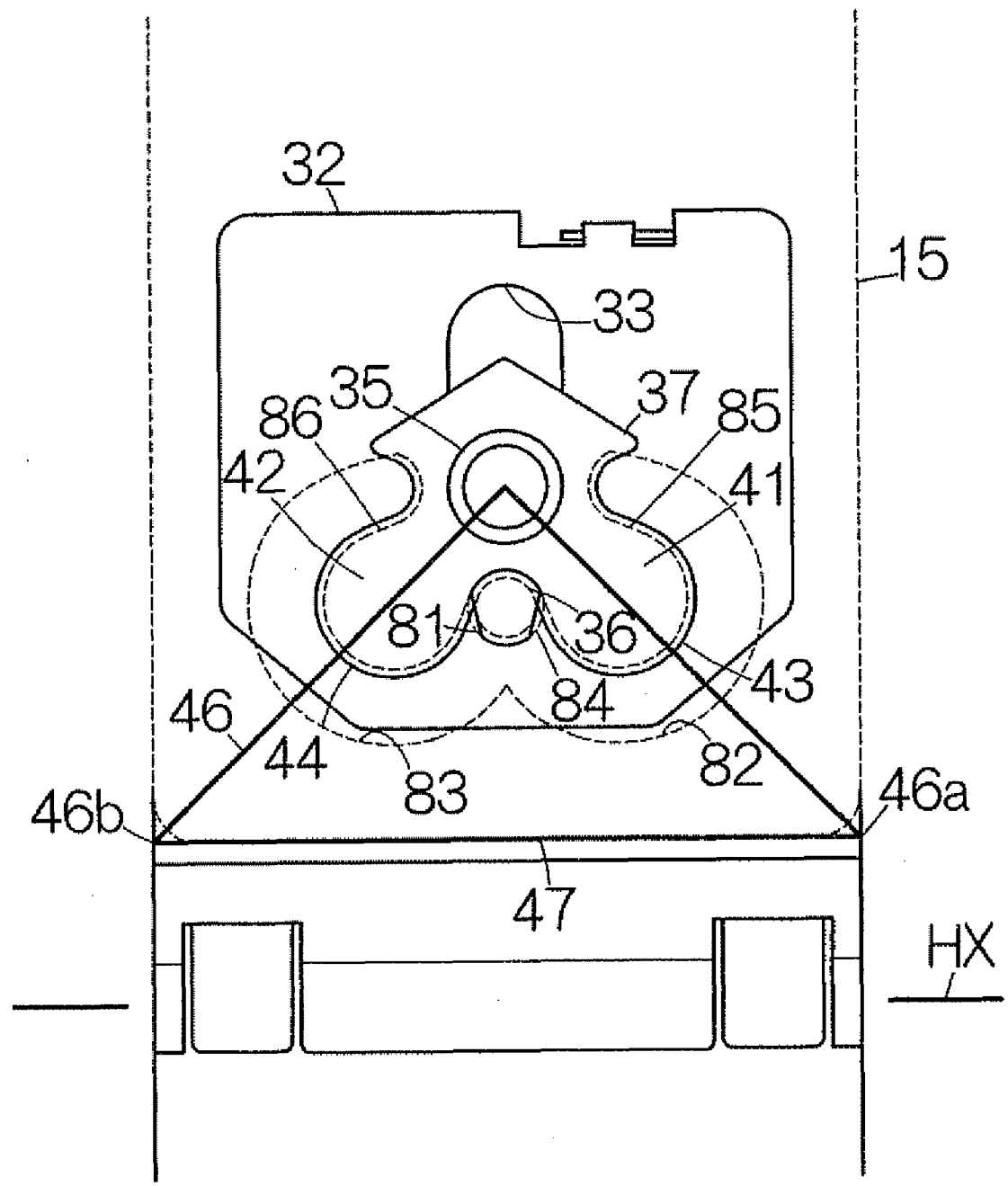
FIG. 29 is an enlarged plan view schematically illustrating a restriction piece attached to the tip end of the guide shaft.

As shown in FIG. 29, a restriction piece 81 is attached to the tip end of the guide shaft 36 in the mobile phone terminal 11, for example. The restriction piece 81 extends outward from the guide shaft 36. A space is defined between the restriction piece 81 and the surface of the fixation plate 32. The rotating plate 37 is placed in such a space. As long as the first outward cam surface 43 and the second outward cam surface 44 of the rotating plate 37 contact with the guide shaft 36, the rotating plate 37 is prevented from slipping off from the guide shaft 36. A detailed description will later be made on the restriction piece 81.

A first guide groove 82 and a second guide groove 83 are formed in the backside of the display enclosure 15. The first guide groove 82 is contoured along a first outward guide wall 85 kept in contact with an imaginary cylinder 84 concentric with the guide shaft 36 when the vertex 46a of the first base angle of the imaginary isosceles right triangle 46 traces the base 47 of the imaginary isosceles right triangle 46 to the vertex 46b of the second base angle. Likewise, the second guide groove 83 is contoured along a second outward guide wall 86 kept in contact with the imaginary cylinder 84 when the vertex 46b of the second base angle of the imaginary isosceles right triangle 46 traces the base 47 of the imaginary isosceles right triangle 46 to the vertex 46a of the first base angle. The restriction piece 81 is received in the first and second guide grooves 82, 83.

Figure 30:
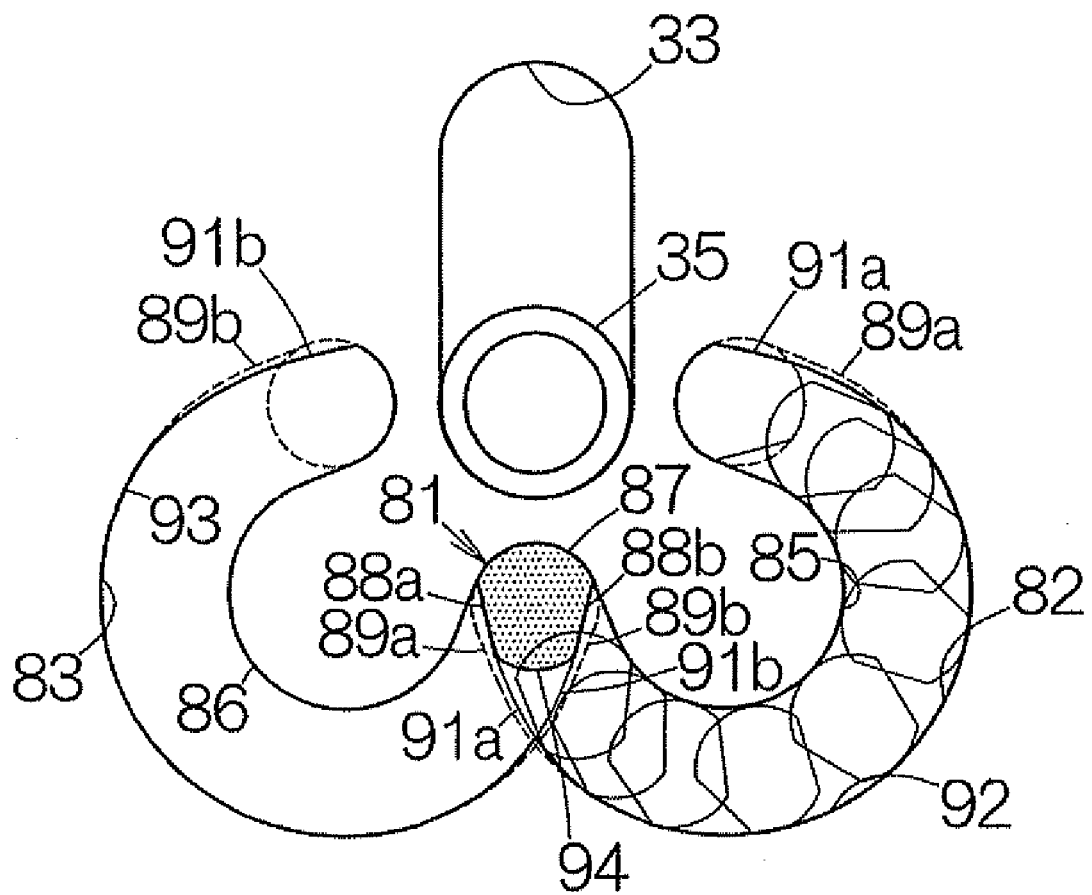
FIG. 30 is an enlarged plan view schematically illustrating the relationship between the restriction piece and first and second guide grooves formed in the display enclosure.

As shown in FIG. 30, the restriction piece 81 defines a partial cylindrical surface 87. The partial cylindrical surface 87 corresponds to a part of the imaginary cylinder 84. The partial cylindrical surface 87 is kept in contact with the first outward guide wall 85 when the vertex 46a of the first base angle of the imaginary isosceles right triangle 46 traces the base 47 of the imaginary isosceles right triangle 46. Likewise, the partial cylindrical surface 87 is kept in contact with the second outward guide wall 86 when the vertex 46b of the second base angle of the imaginary isosceles right triangle 46 traces the base 47 of the imaginary isosceles right triangle. In other words, the extent of the partial cylindrical surface 87, namely the central angle of the partial cylindrical surface 87 around the longitudinal axis, is determined based on the contact with the first guide wall 85 and the second guide wall 86.

The restriction piece 81 defines a pair of chipping surfaces 88a, 88b. The imaginary cylinder 84 is chipped off at a position outside the partial cylindrical surface 87 based on the chipping surfaces 88a, 88b. The chipping surface 88a is designed to describe an actual movement path 91a inside an imaginary movement path 89a which the contour of the imaginary cylinder 84 describes when the vertex 46a of the first base angle of the imaginary isosceles right triangle 46 traces the base 47 of the imaginary isosceles right triangle 46. Likewise, the chipping surface 88b is designed to describe an actual movement path 91b inside an imaginary movement path 89b which the contour of the imaginary cylinder 84 describes when the vertex 46b of the second base angle of the imaginary isosceles right triangle 46 traces the base 47 of the imaginary isosceles right triangle 46.

A third inward guide wall 92 is opposed to the first outward guide wall 85 to define the aforementioned first guide groove 82. The first guide groove 82 is defined between the first outward guide wall 85 and the third inward guide wall 92. The third inward guide wall 92 extends along the actual movement path 91a at the opposite ends of the first guide groove 82 when the vertex 46a of the first base angle of the imaginary isosceles right triangle 46 traces the base 47 of the imaginary isosceles right triangle 46. Likewise, a fourth inward guide wall 93 is opposed to the second outward guide wall 86 to define the aforementioned second guide groove 83. The second guide groove 83 is defined between the second outward guide wall 86 and the fourth inward guide wall 93. The fourth inward guide wall 93 extends along the actual movement path 91b at the opposite ends of the second guide groove 83 when the vertex 46b of the second base angle of the imaginary isosceles right triangle 46 traces the base 47 of the imaginary isosceles right triangle 46.

A restricting surface 94 extends on the side opposite to the partial cylindrical surface 87 at a position between the chipping surfaces 88a, 88b. The restricting surface 94 may correspond to apart of the imaginary cylinder 84. Alternatively, the restricting surface 94 may protrude outward from the imaginary cylinder 84. In the latter case, the third inward guide wall 92 and the fourth inward guide wall 93 may be designed based on the movement path of the protruding restricting surface 94.

The mobile phone terminal 11 allows the intersection between the third inward guide wall 92 and the fourth inward guide wall 93 to get closer to the restriction piece 81 at a position inside the intersection between the imaginary movement paths 89a, 89b, when the display enclosure 15 is set in the upright attitude, in other words, when the rotating plate 37 is set in the reference attitude. The movement range of the display enclosure 15 is thus narrowed. This results in suppression of rattling of the display enclosure 15.

What is claimed is:

1. An electronic apparatus comprising:
   a first enclosure;
   a second enclosure defining a backside superposed on the first enclosure for relative rotation around a rotation axis set perpendicular to a front surface of the first enclosure, said relative rotation being restricted within a range of plus/minus 90 degrees from a reference attitude;
   a first flat surface defined on the backside of the second enclosure at a position inside a contour of the second enclosure, the first flat surface facing outward in a radial direction of the rotation axis, the first flat surface extending straight along an imaginary plane set perpendicular to the rotation axis;
   a second flat surface defined on the backside of the second enclosure at a position inside the contour of the second enclosure, the second flat surface facing outward in the radial direction of the rotation axis, the second flat surface extending from one end of the first flat surface along the imaginary plane in a direction perpendicular to the first flat surface;
   a third flat surface defined on the backside of the second enclosure at a position inside the contour of the second enclosure, the third flat surfaced facing outward in the radial direction of the rotation axis, the third flat surface extending along the imaginary plane from an other end of the first flat surface in parallel with the second flat surface; and
   a pair of receiving pieces placed on the front surface of the first enclosure at a position inside the contour of the second enclosure, the receiving pieces receiving the first flat surface at a position behind the second enclosure when the second enclosure is set in the reference attitude, the receiving pieces receiving the second flat surface at a position behind the second enclosure when the second enclosure is set in an attitude of the plus 90 degrees from the reference attitude around the rotation axis, the receiving pieces receiving the third flat surface at a position behind the second enclosure when the second enclosure is set in an attitude of the minus 90 degrees from the reference attitude.

2. The electronic apparatus according to claim 1, further comprising:
   a fixation plate fixed to the first enclosure;
   a guide opening formed in the fixation plate, the guide opening extending along a reference straight line set parallel to the second flat surface and the third flat surface when the second enclosure is set in the reference attitude;
   a cylinder received in the guide opening, the cylinder designed to move within the guide opening along the reference straight line with its longitudinal axis kept in a perpendicular attitude normal to the fixation plate;
   a rotating plate coupled to the cylinder, the rotating plate superposed on the fixation plate for relative rotation around the longitudinal axis of the cylinder, the relative rotation being restricted in a range of plus/minus 90 degrees from a reference attitude, the rotating plate being fixed to the backside of the second enclosure; and
   an elastic member attached to the fixation plate for engagement with the cylinder, the elastic member exhibiting an elastic force for urging the cylinder toward one end of the guide opening.

3. A coupling unit comprising:
   a fixation plate;
   a guide opening formed in the fixation plate, the guide opening extending along a predetermined reference straight line;
   a cylinder received in the guide opening, the cylinder designed to move within the guide opening along the predetermined reference straight line with its longitudinal axis kept in a perpendicular attitude normal to the fixation plate;
   a rotating plate coupled to the cylinder, the rotating plate superposed on the fixation plate for relative rotation around the longitudinal axis of the cylinder, the relative rotation being restricted in a range of plus/minus 90 degrees from a reference attitude;
   an elastic member attached to the fixation plate for engagement with the cylinder, the elastic member exhibiting an elastic force for urging the cylinder toward one end of the guide opening; and
   a pair of protrusions placed on the fixation plate at a position outside the guide opening, the protrusions being symmetric relative to the predetermined reference straight line, the protrusions receiving an edge of the rotating plate when the rotating plate is set in one of the reference attitude, an attitude of the plus 90 degrees from the reference attitude and an attitude of the minus 90 degrees from the reference attitude.

4. A coupling unit comprising:
   a fixation plate;
   a guide opening formed in the fixation plate, the guide opening extending along a predetermined reference straight line;
   a cylinder received in the guide opening, the cylinder designed to move within the guide opening along the predetermined reference straight line with its longitudinal axis kept in a perpendicular attitude normal to the fixation plate;
   a rotating plate coupled to the cylinder, the rotating plate superposed on the fixation plate for relative rotation around the longitudinal axis of the cylinder, the relative rotation being restricted in a range of plus/minus 90 degrees from a reference attitude; and
   a torsion spring attached to the fixation plate, the torsion spring including an arm portion extending from a coil portion, the arm portion engaging with an outer peripheral surface of the cylinder, the torsion spring exhibiting an elastic force for urging the cylinder toward one end of the guide opening, wherein
   an inclined surface is defined on the outer peripheral surface of the cylinder, the inclined surface getting farther from the longitudinal axis of the cylinder as position gets farther away from a front surface of the fixation plate, the inclined surface receiving the arm portion of the torsion spring.

5. The coupling unit according to claim 4, further comprising:
   a flange coupled to the cylinder, the flange extending outward from the cylinder so that the cylinder is held within the guide opening between the flange and the rotating plate; and
   an elastic member placed on the fixation plate at a position outside the one end of the guide opening, the elastic member exhibiting an elastic force in a direction to distance the flange away from the fixation plate.

6. An electronic apparatus comprising:
   a first enclosure;
   a fixation plate fixed to a front surface of the first enclosure;
   a guide opening formed in the fixation plate, the guide opening extending along a predetermined reference straight line;
   a cylinder received in the guide opening, the cylinder designed to move within the guide opening along the predetermined reference straight line with its longitudinal axis kept in a perpendicular attitude normal to the fixation plate;
   a rotating plate coupled to the cylinder, the rotating plate superposed on the fixation plate for relative rotation around the longitudinal axis of the cylinder, the relative rotation being restricted in a range of plus/minus 90 degrees from a reference attitude;
   a torsion spring attached to the fixation plate, the torsion spring including an arm portion extending from a coil portion, the arm portion engaging with an outer peripheral surface of the cylinder, the torsion spring exhibiting an elastic force for urging the cylinder to be urged toward one end of the guide opening; and
   a second enclosure defining a backside coupled to the rotating plate, the backside being superposed on the front surface of the first enclosure, wherein
   an inclined surface is defined on the outer peripheral surface of the cylinder, the inclined surface getting farther from the longitudinal axis of the cylinder as position gets farther away from a front surface of the fixation plate, the inclined surface receiving the arm portion of the torsion spring.

7. The electronic apparatus according to claim 6, further comprising:
   a flange coupled to the cylinder, the flange extending outward from the cylinder so that the cylinder is held within the guide opening between the flange and the rotating plate; and
   an elastic member placed on the fixation plate at a position outside the one end of the guide opening, the elastic member exhibiting an elastic force in a direction to distance the flange away from the fixation plate.

* * * * *